United States Patent
Hirasawa

(10) Patent No.: US 11,209,585 B2
(45) Date of Patent: Dec. 28, 2021

(54) ILLUMINATING UNIT AND DISPLAY APPARATUS

(71) Applicant: Saturn Licensing LLC, New York, NY (US)

(72) Inventor: Takeaki Hirasawa, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 117 days.

(21) Appl. No.: 15/562,106

(22) PCT Filed: Mar. 1, 2016

(86) PCT No.: PCT/JP2016/056202
§ 371 (c)(1),
(2) Date: Sep. 27, 2017

(87) PCT Pub. No.: WO2016/163176
PCT Pub. Date: Oct. 13, 2016

(65) Prior Publication Data
US 2018/0074249 A1    Mar. 15, 2018

(30) Foreign Application Priority Data

Apr. 6, 2015 (JP) .............................. JP2015-077327
Nov. 20, 2015 (JP) .............................. JP2015-227573

(51) Int. Cl.
*F21V 8/00* (2006.01)
*F21V 19/00* (2006.01)
(Continued)

(52) U.S. Cl.
CPC ............. *G02B 6/0011* (2013.01); *F21S 2/00* (2013.01); *F21V 7/0008* (2013.01); *F21V 19/00* (2013.01);
(Continued)

(58) Field of Classification Search
CPC .... G02B 6/0076; G02B 6/002; G02B 6/0083; G02B 6/0085; G02B 6/0091; G02B 6/0081; G02B 6/0075
See application file for complete search history.

(56) References Cited

U.S. PATENT DOCUMENTS 7,001,048 B2 *   2/2006   Kuo .................... G02B 6/0031
                                                            362/301
8,419,257 B2     4/2013   Nagatani
(Continued)

FOREIGN PATENT DOCUMENTS

CN       102171602 A      8/2011
CN       102418881 A      4/2012
(Continued)

OTHER PUBLICATIONS

International Search Report and Written Opinion of PCT Application No. PCT/JP2016/056202, dated May 24, 2016, 11 pages of ISRWO.

*Primary Examiner* — Alexander K Garlen
*Assistant Examiner* — Colin J Cattanach
(74) *Attorney, Agent, or Firm* — Lerner, David, Littenberg, Krumholz & Mentlik, LLP

(57) ABSTRACT

An illuminating unit includes a light-guiding section including a plurality of light-guiding plates, in which the light-guiding plates are stacked in a thickness direction and each have a light entrance section and a light output surface, a plurality of light sources that output light toward the light entrance sections of the respective light-guiding plates of the light-guiding section, and a substrate that supports the plurality of light sources and on which a circuit section is disposed, in which the circuit section drives each of the light sources. A first portion, on which the circuit section is
(Continued)

disposed, of the substrate is disposed in opposition to a back surface of the light-guiding section.

21 Claims, 18 Drawing Sheets

(51) Int. Cl.
| | |
|---|---|
| *F21V 29/503* | (2015.01) |
| *F21V 29/70* | (2015.01) |
| *F21S 2/00* | (2016.01) |
| *F21V 29/508* | (2015.01) |
| *F21V 7/00* | (2006.01) |
| *F21V 23/00* | (2015.01) |

(52) U.S. Cl.
CPC .......... *F21V 23/004* (2013.01); *F21V 29/503* (2015.01); *F21V 29/508* (2015.01); *F21V 29/70* (2015.01); *G02B 6/0068* (2013.01); *G02B 6/0076* (2013.01); *G02B 6/0091* (2013.01); *F21V 2200/20* (2015.01); *G02B 6/0083* (2013.01); *G02B 6/0085* (2013.01); *G02B 6/0093* (2013.01)

(56) References Cited

U.S. PATENT DOCUMENTS

| | | | | |
|---|---|---|---|---|
| 9,864,125 | B2* | 1/2018 | Gierens | B32B 17/10036 |
| 2004/0114344 | A1* | 6/2004 | Burtsev | G02B 6/0001 |
| | | | | 362/604 |
| 2007/0230869 | A1* | 10/2007 | Sailer | G02B 6/0001 |
| | | | | 385/27 |
| 2009/0116262 | A1* | 5/2009 | Park | H05K 1/0203 |
| | | | | 362/612 |
| 2010/0066937 | A1* | 3/2010 | Yamashita | G02B 6/0085 |
| | | | | 349/58 |
| 2010/0157197 | A1* | 6/2010 | Lee | G02B 6/0061 |
| | | | | 349/62 |
| 2010/0220260 | A1 | 9/2010 | Sugita et al. | |
| 2011/0141767 | A1 | 6/2011 | Box et al. | |
| 2011/0227895 | A1* | 9/2011 | Takahashi | G02B 6/0061 |
| | | | | 345/211 |
| 2011/0267833 | A1 | 11/2011 | Verrat-Debailleul et al. | |
| 2011/0286235 | A1* | 11/2011 | Tsai | G02B 6/0085 |
| | | | | 362/606 |
| 2012/0002444 | A1* | 1/2012 | Kim | G02B 6/0036 |
| | | | | 362/613 |
| 2012/0026424 | A1* | 2/2012 | Youk | G02B 6/0083 |
| | | | | 349/62 |
| 2012/0075326 | A1* | 3/2012 | Tsuchiya | G02B 6/0058 |
| | | | | 345/589 |
| 2012/0106199 | A1* | 5/2012 | Chen | G02B 6/0068 |
| | | | | 362/613 |
| 2012/0113155 | A1* | 5/2012 | Fang | G02B 6/0055 |
| | | | | 345/690 |
| 2012/0113682 | A1* | 5/2012 | Morino | G02B 6/0076 |
| | | | | 362/613 |
| 2012/0188465 | A1* | 7/2012 | Ohyama | G02B 6/0036 |
| | | | | 348/739 |
| 2012/0294041 | A1* | 11/2012 | Huang | G02B 6/0085 |
| | | | | 362/612 |
| 2013/0100694 | A1* | 4/2013 | Chen | G02B 6/0085 |
| | | | | 362/602 |
| 2013/0134448 | A1* | 5/2013 | Zhou | G02B 6/0091 |
| | | | | 257/88 |
| 2013/0265526 | A1* | 10/2013 | Park | G02B 6/0073 |
| | | | | 349/65 |
| 2013/0286682 | A1* | 10/2013 | Lin | G02B 6/0055 |
| | | | | 362/609 |
| 2013/0294052 | A1* | 11/2013 | Chang | G02B 6/0085 |
| | | | | 362/97.3 |
| 2014/0098563 | A1* | 4/2014 | Kim | G02B 6/0076 |
| | | | | 362/606 |
| 2015/0192729 | A1* | 7/2015 | Hosoki | G02F 1/133308 |
| | | | | 348/794 |
| 2015/0369996 | A1* | 12/2015 | Tsai | G02B 6/0065 |
| | | | | 362/612 |
| 2016/0246105 | A1* | 8/2016 | Li | G02F 1/133308 |
| 2016/0381317 | A1* | 12/2016 | Hosoki | G02B 6/0083 |
| | | | | 349/65 |
| 2017/0168230 | A1* | 6/2017 | Byun | G02B 6/0091 |
| 2017/0205552 | A1* | 7/2017 | Gierens | B32B 17/10779 |

FOREIGN PATENT DOCUMENTS

| | | |
|---|---|---|
| EP | 2310906 A1 | 4/2011 |
| FR | 2935063 A1 | 2/2010 |
| JP | 2004-303564 A | 10/2004 |
| JP | 2006-201215 A | 8/2006 |
| JP | 2008-103301 A | 5/2008 |
| JP | 2008-112739 A | 5/2008 |
| JP | 2008-171797 A | 7/2008 |
| JP | 20099080 A | 1/2009 |
| JP | 2010-204256 A | 9/2010 |
| JP | 2011-530791 A | 12/2011 |
| JP | 2012014947 A | 1/2012 |
| JP | 2012-069461 A | 4/2012 |
| WO | 2008/035624 A1 | 3/2008 |
| WO | 2010/017911 A1 | 2/2010 |

* cited by examiner

[ FIG. 1 ]
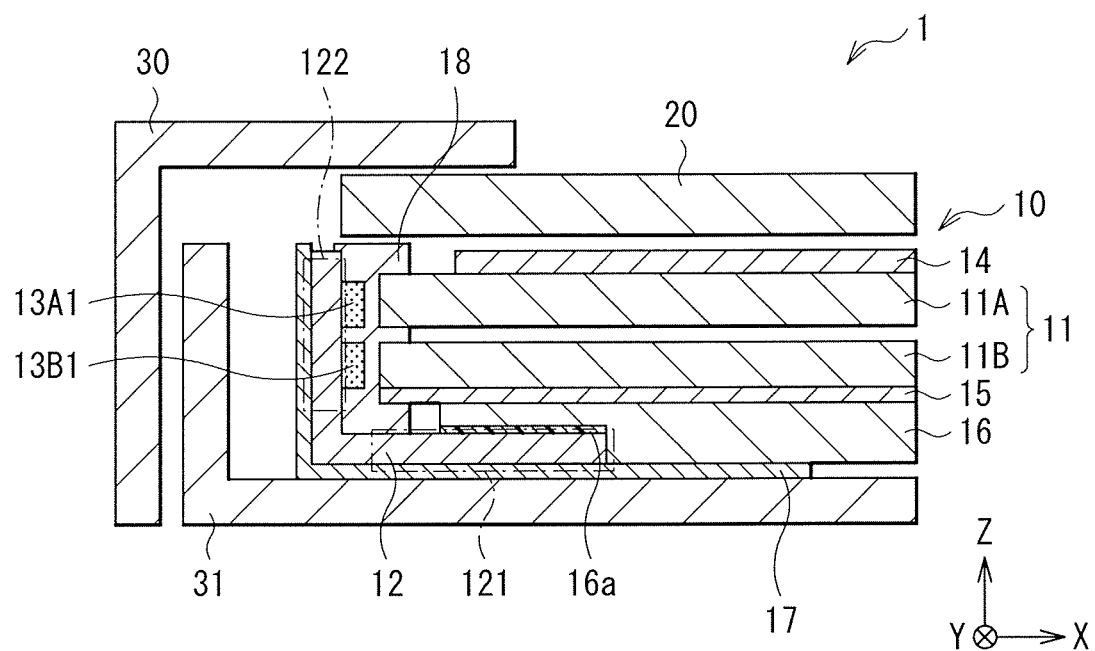
[ FIG. 2 ]
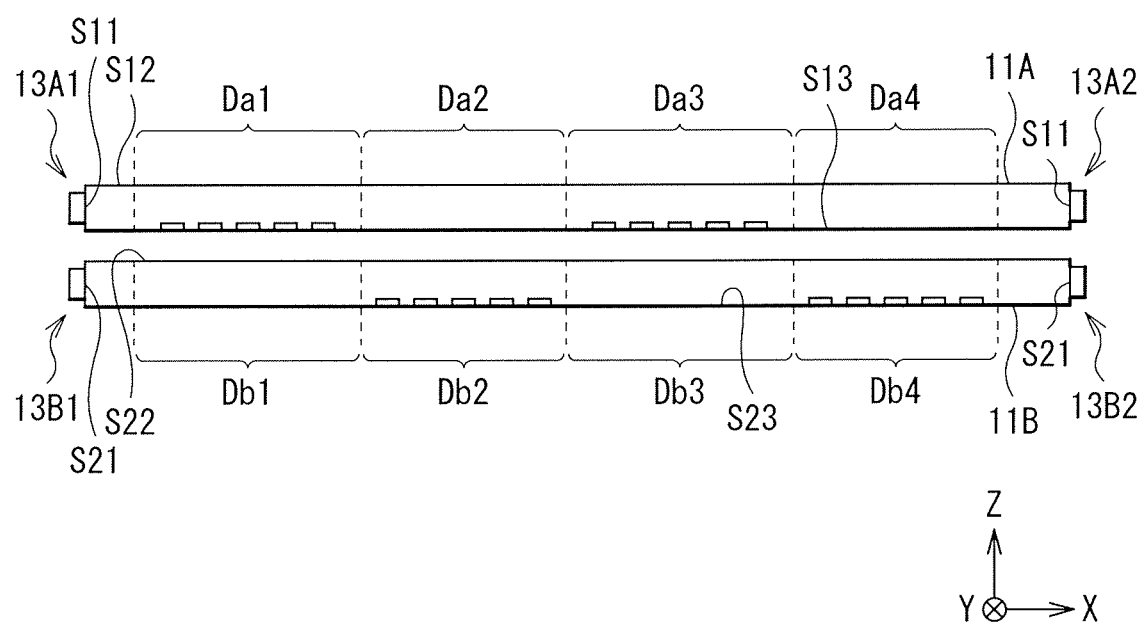

[ FIG. 3A ]
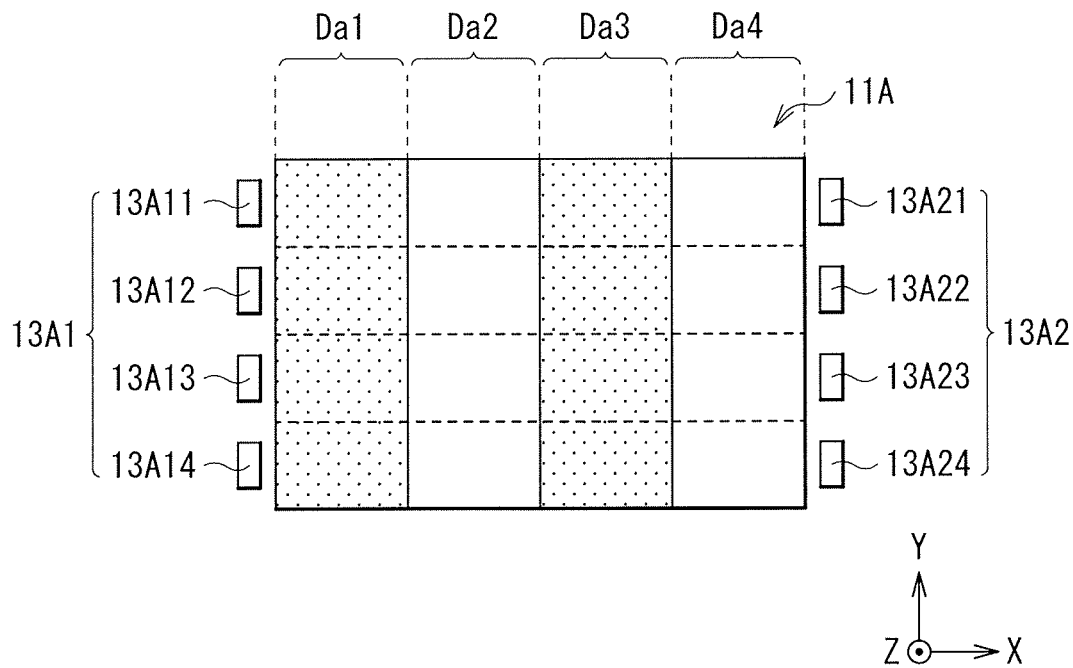
[ FIG. 3B ]
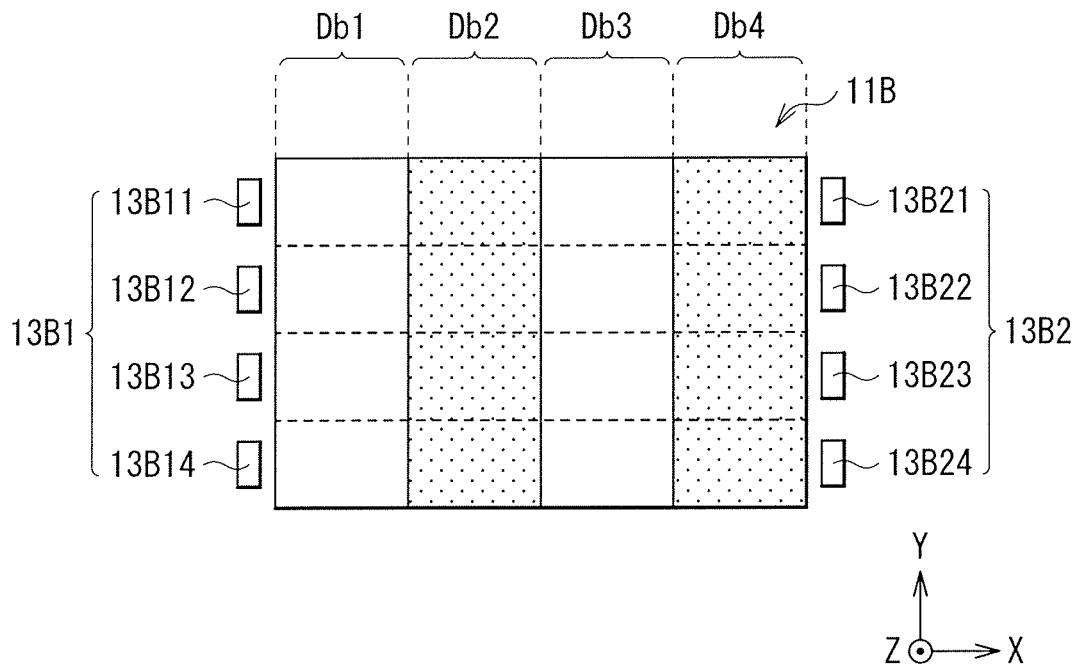

[ FIG. 4A ]
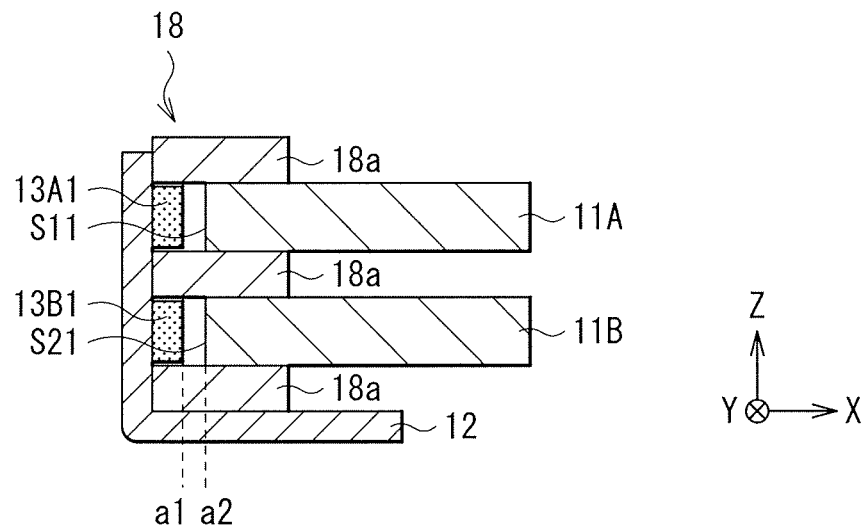
[ FIG. 4B ]
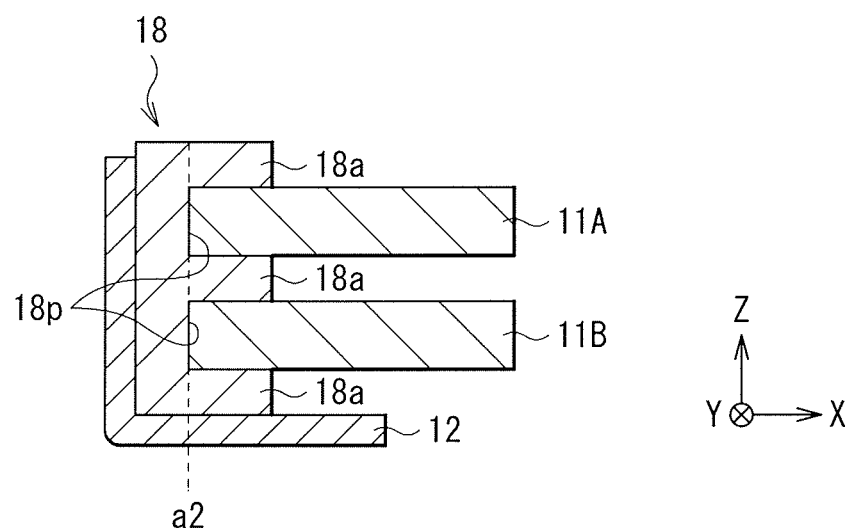

[ FIG. 5A ]
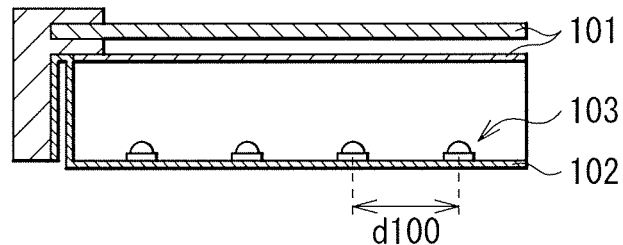
[ FIG. 5B ]
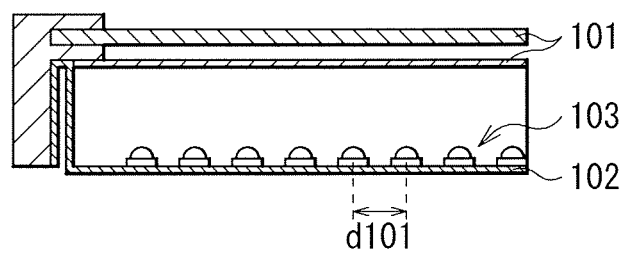
[ FIG. 6 ]
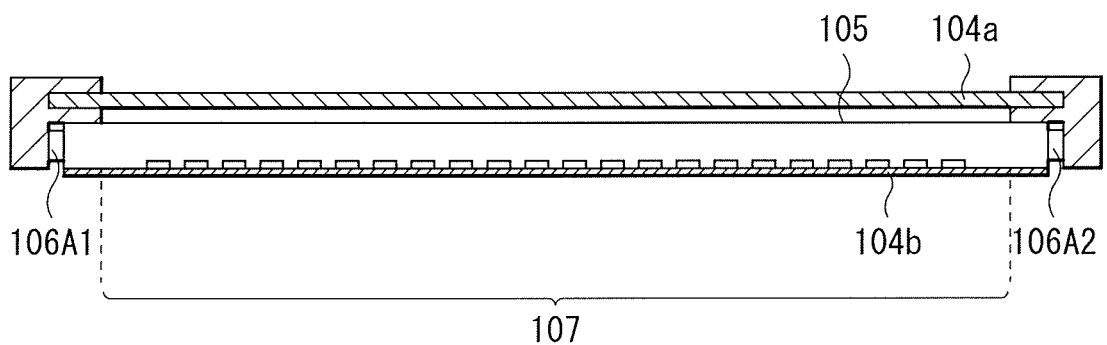
[ FIG. 7 ]
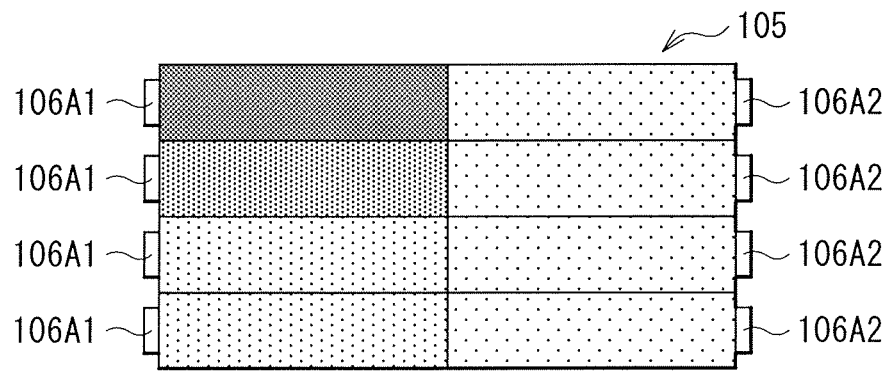

[ FIG. 8A ]
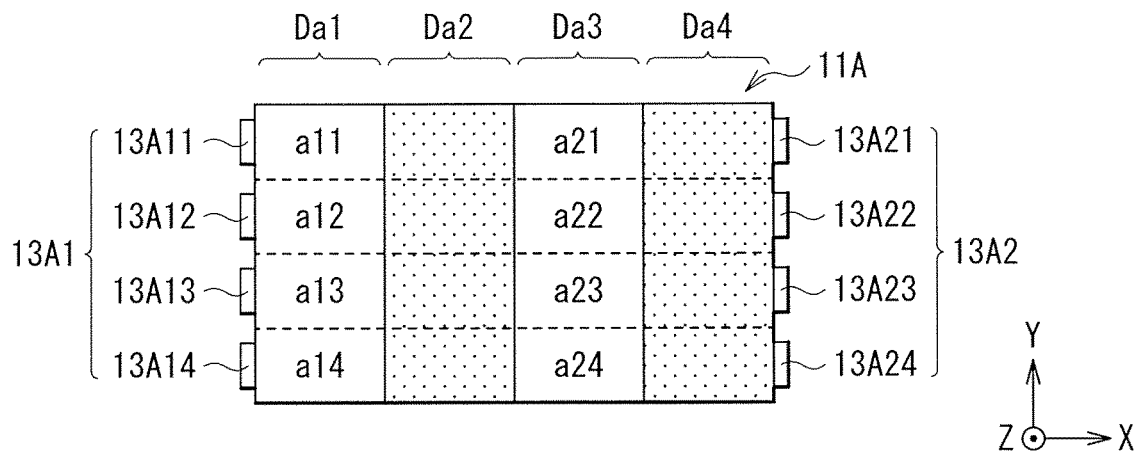
[ FIG. 8B ]
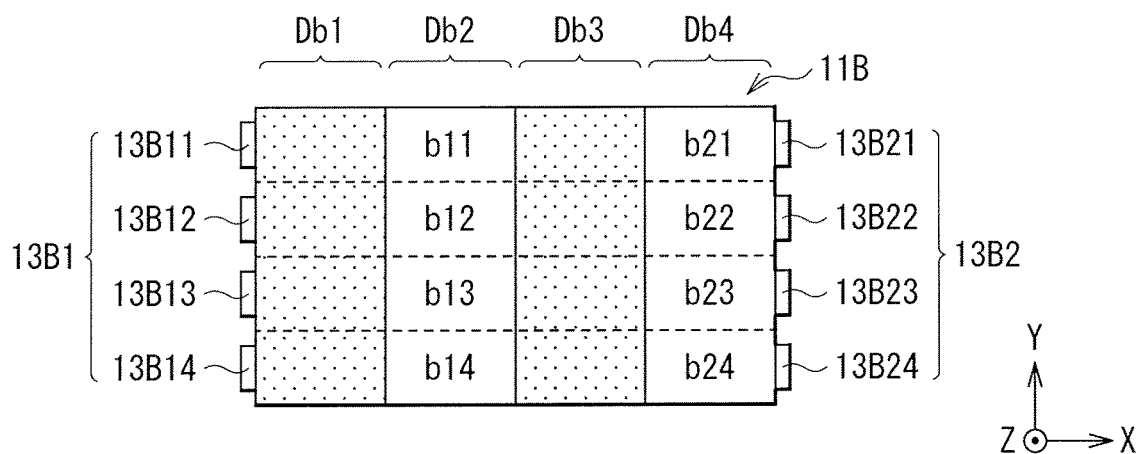
[ FIG. 9 ]
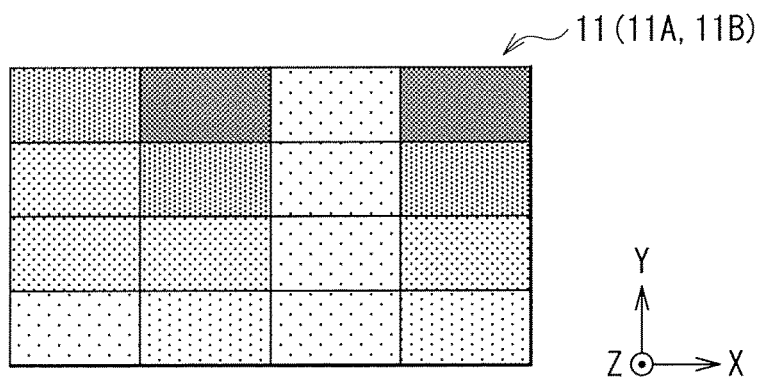

[ FIG. 10 ]
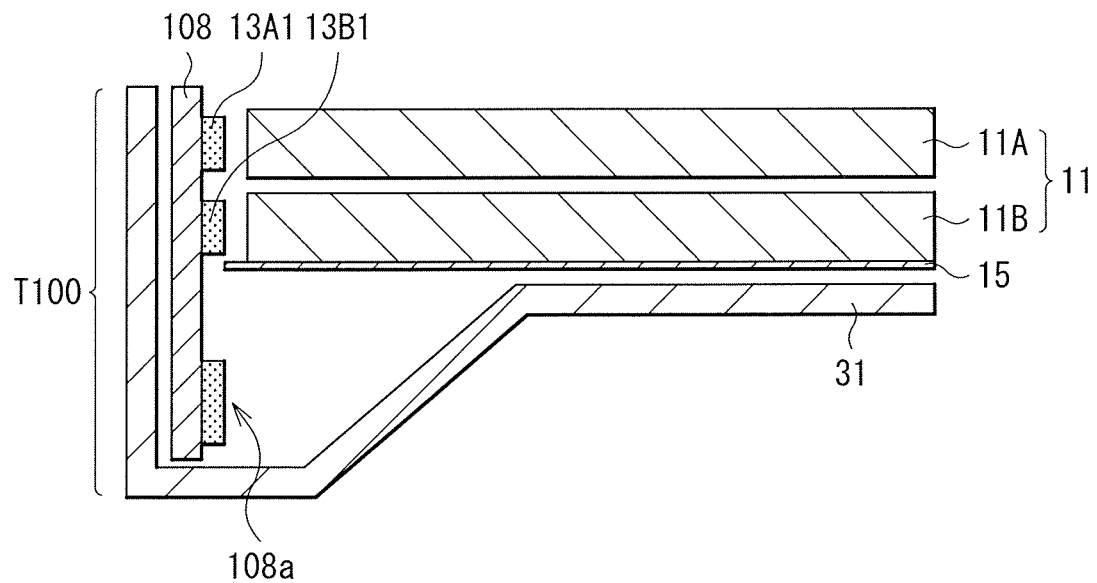
[ FIG. 11 ]
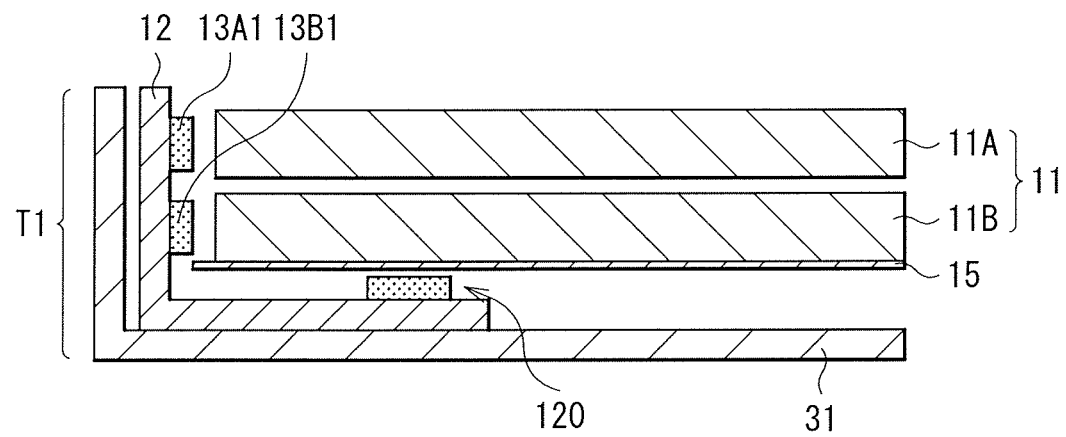

[ FIG. 12 ]
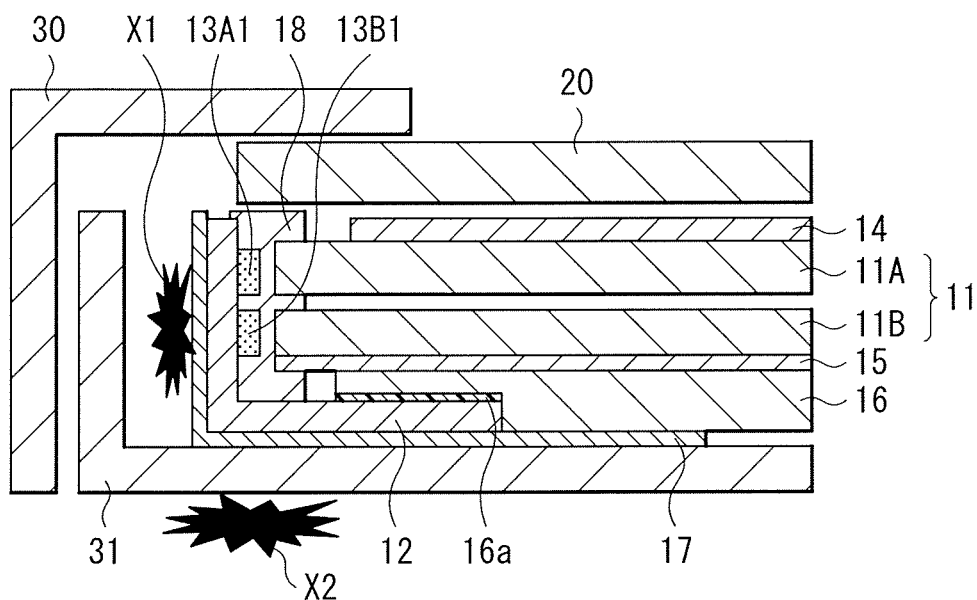
[ FIG. 13 ]
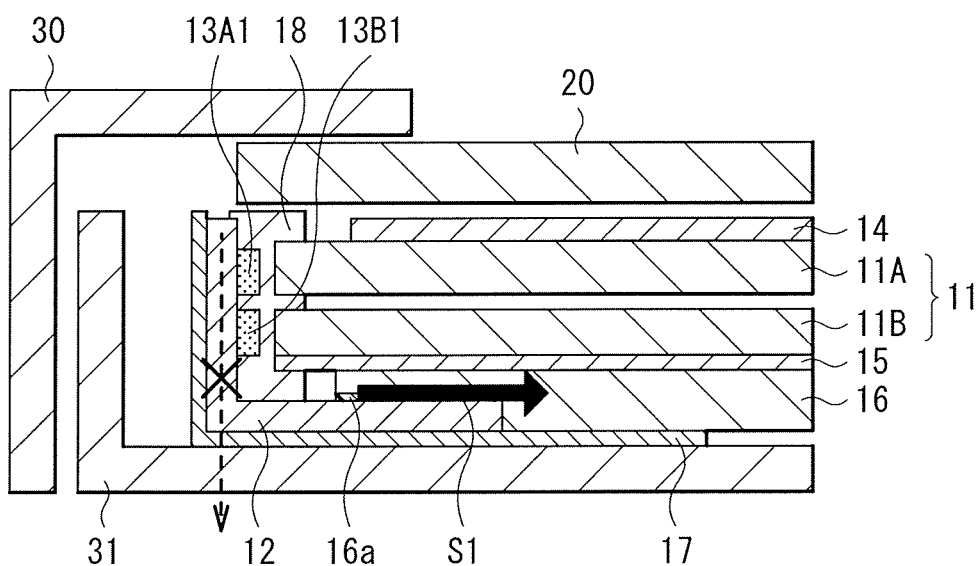

[ FIG. 14 ]
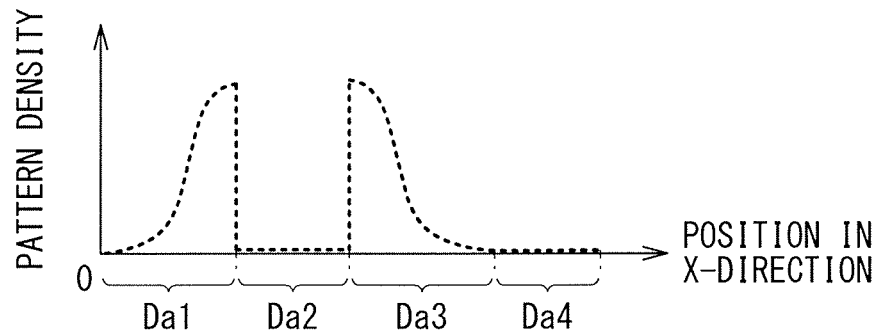
[ FIG. 15A ]
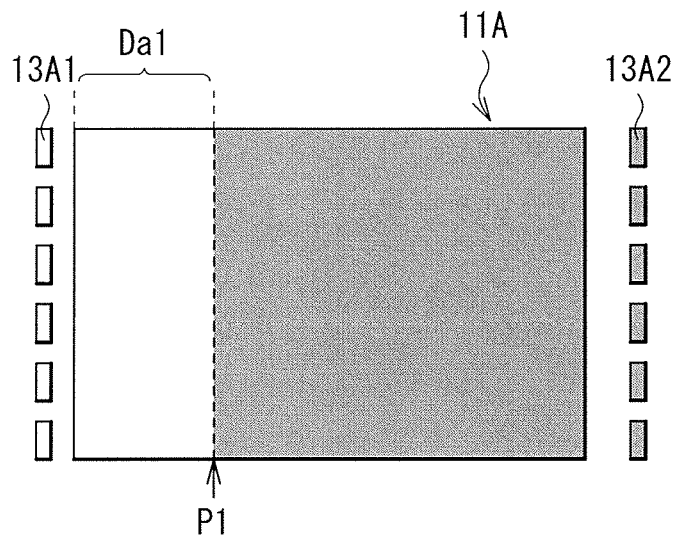
[ FIG. 15B ]
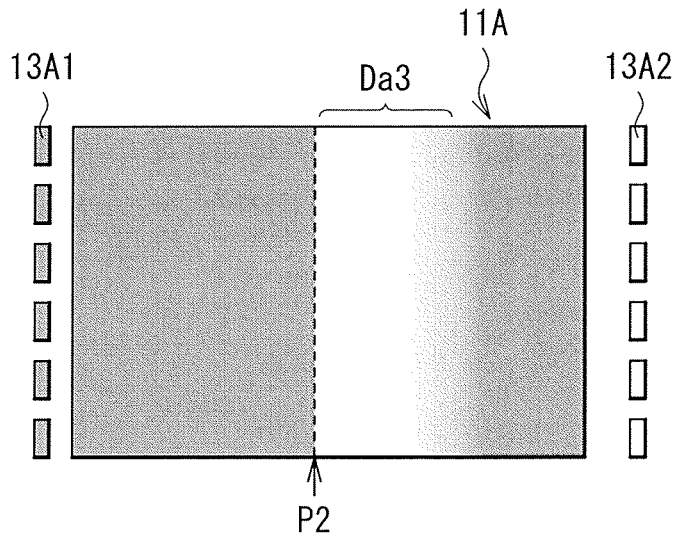

[ FIG. 16 ]
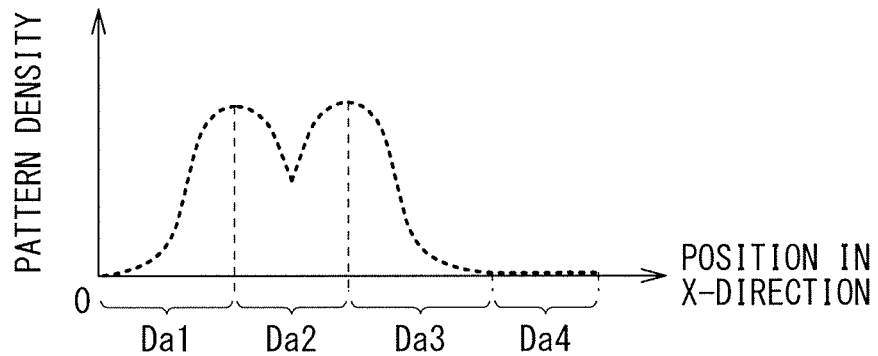
[ FIG. 17A ]
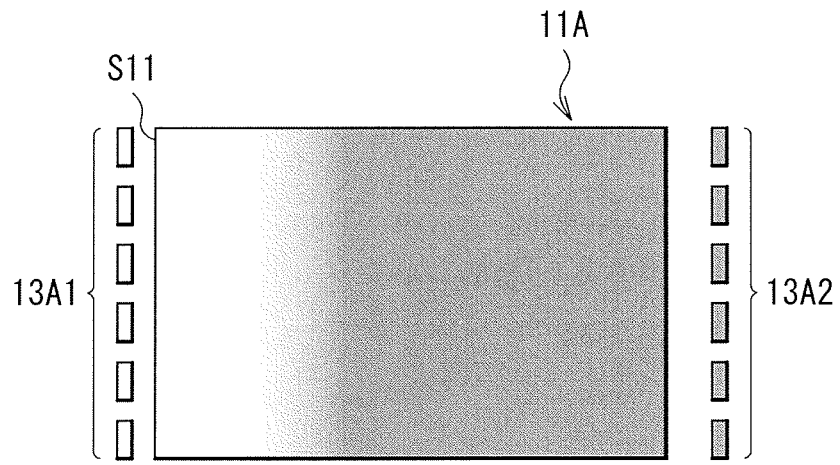
[ FIG. 17B ]
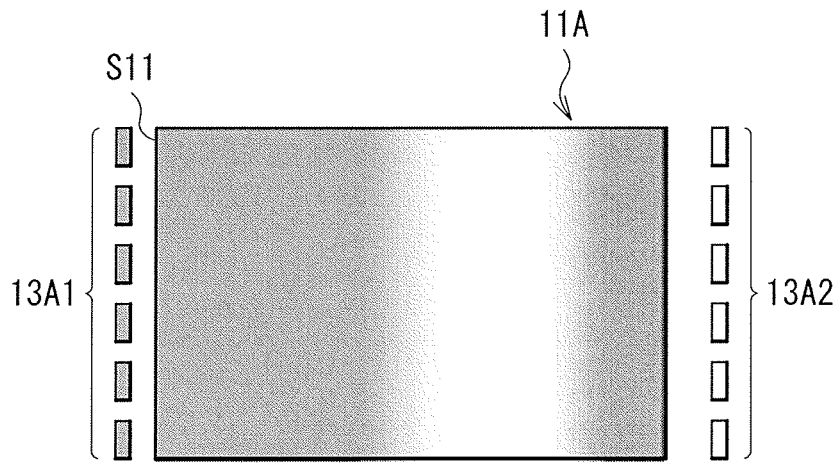

[ FIG. 18 ]
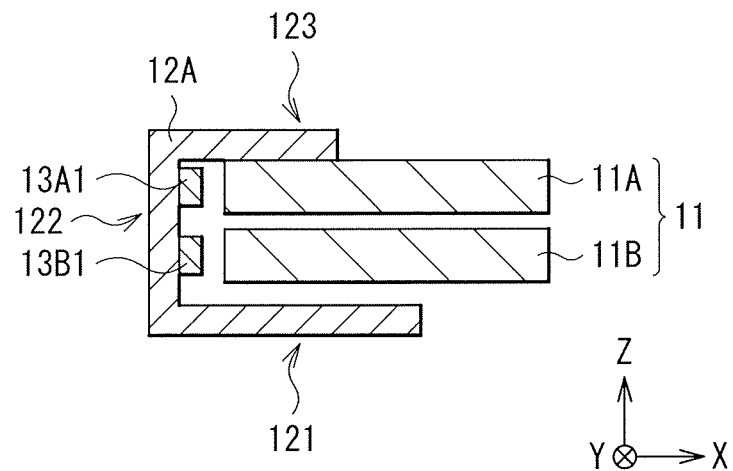
[ FIG. 19 ]
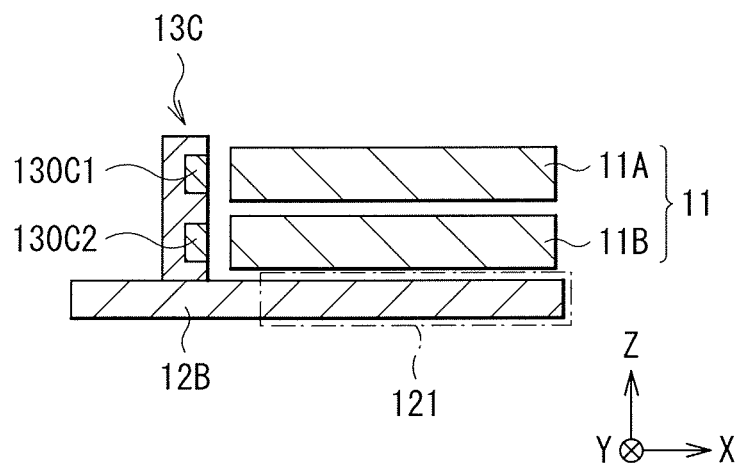
[ FIG. 20 ]
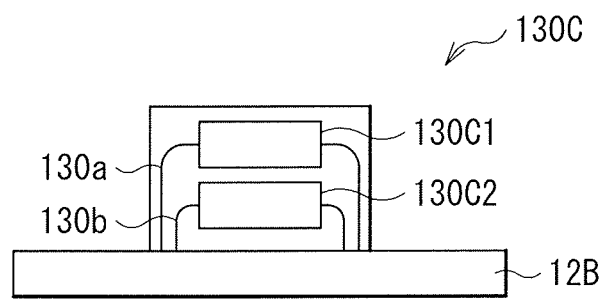

[ FIG. 21A ]
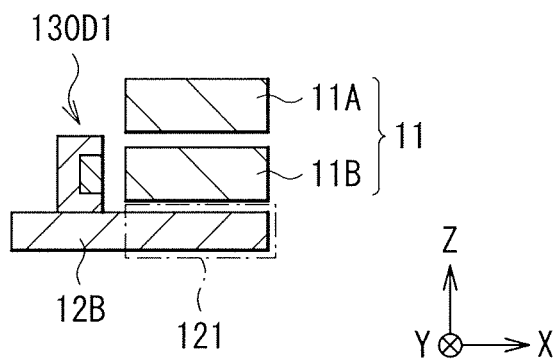
[ FIG. 21B ]
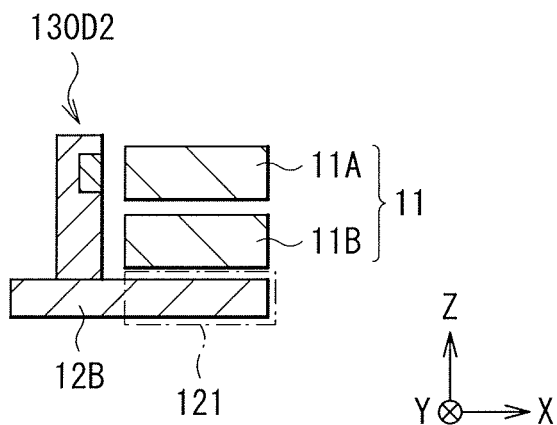
[ FIG. 22 ]
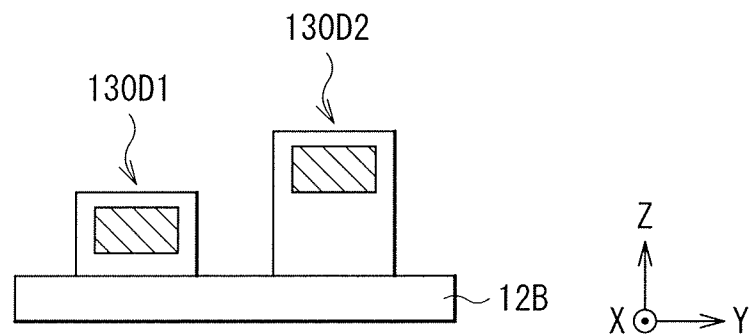

[FIG. 23]
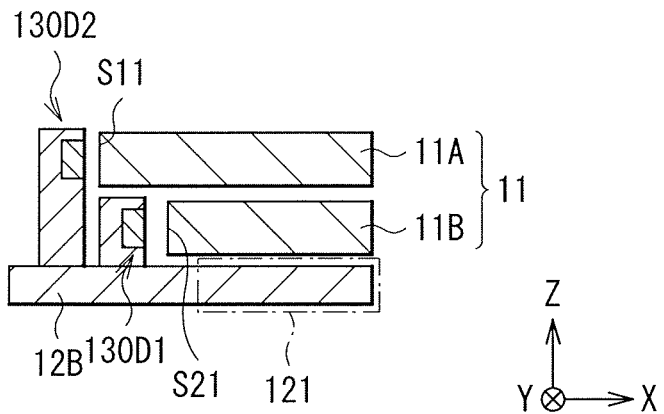
[FIG. 24]
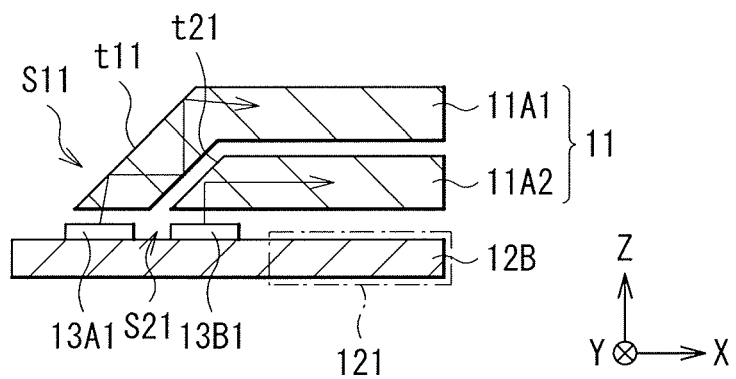
[FIG. 25]
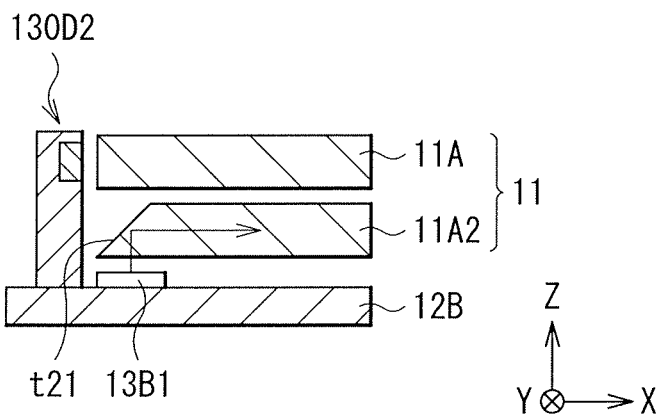

[ FIG. 26 ]
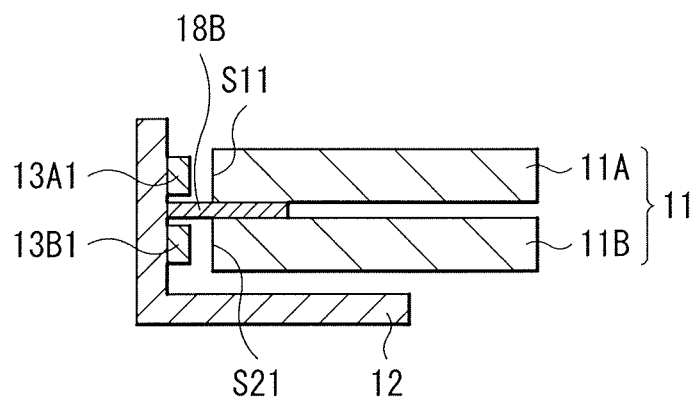
[ FIG. 27 ]
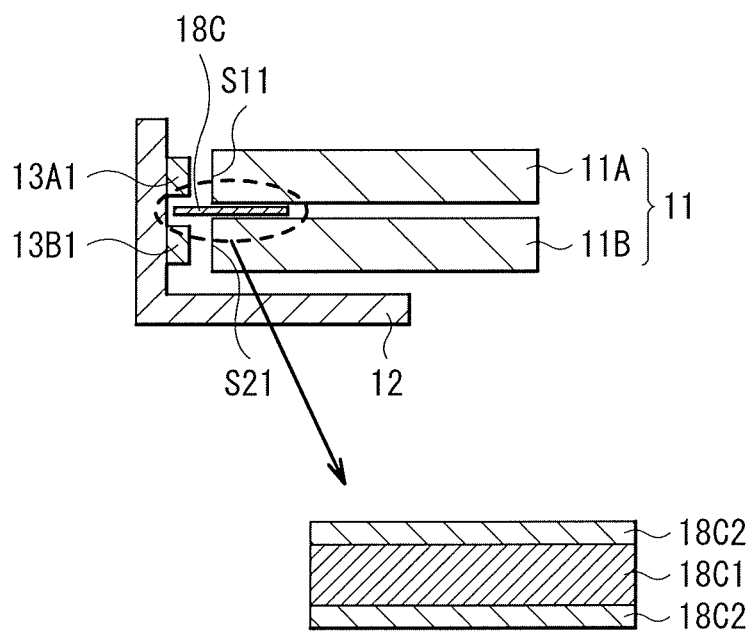

[ FIG. 28 ]
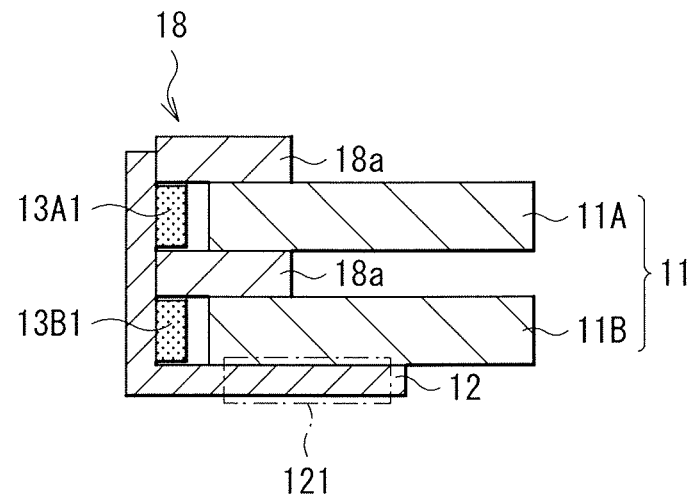
[ FIG. 29 ]
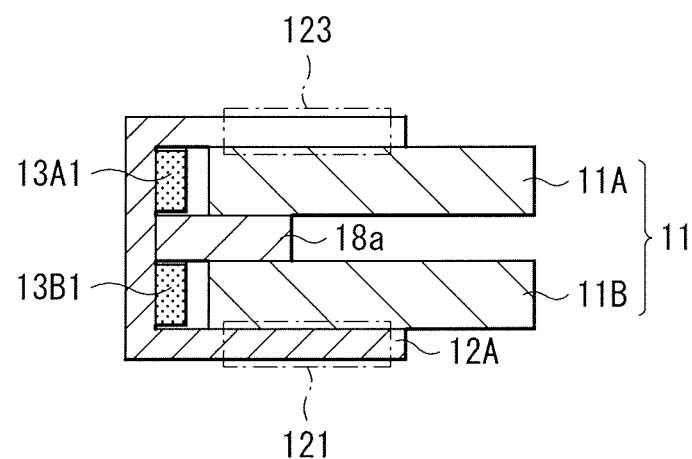
[ FIG. 30 ]
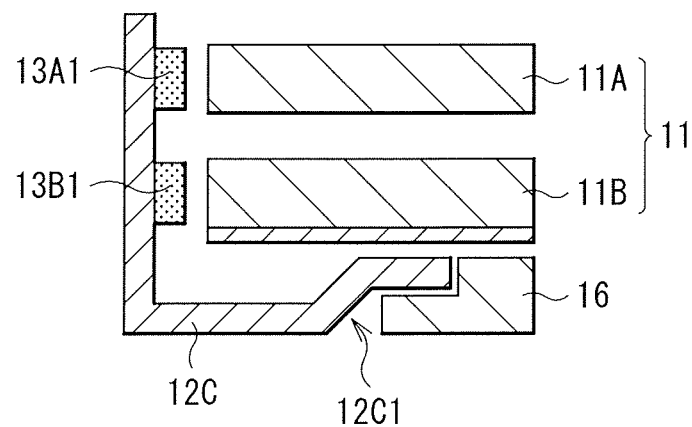

[ FIG. 31A ]
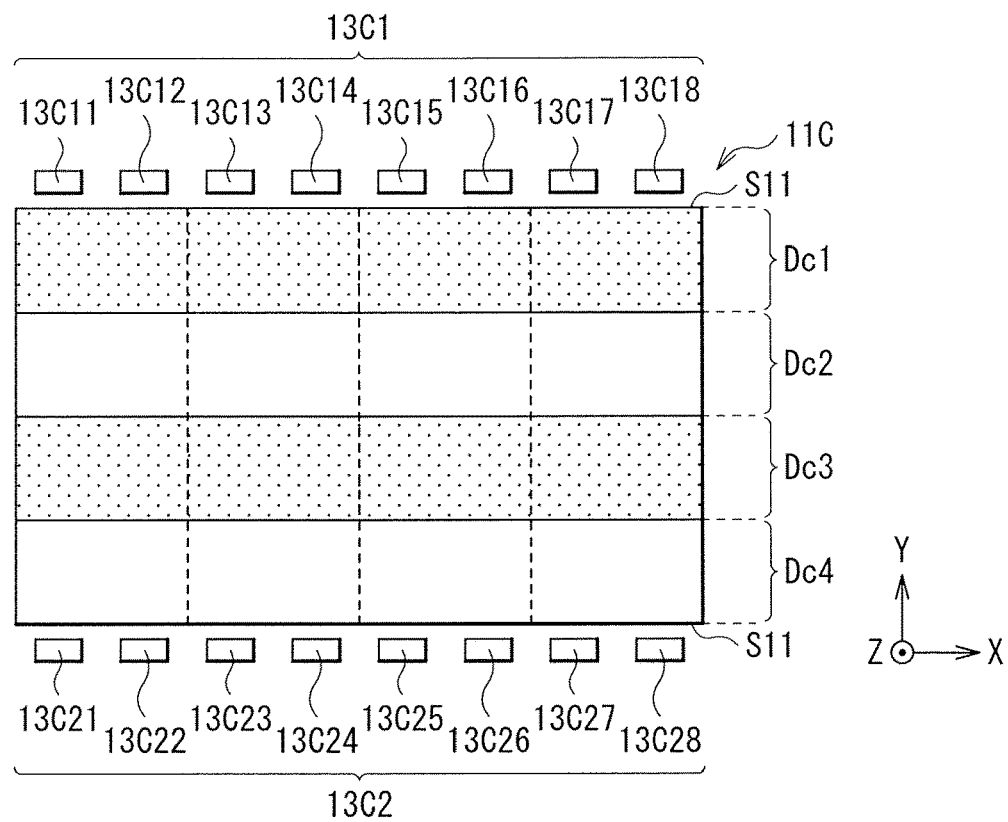
[ FIG. 31B ]
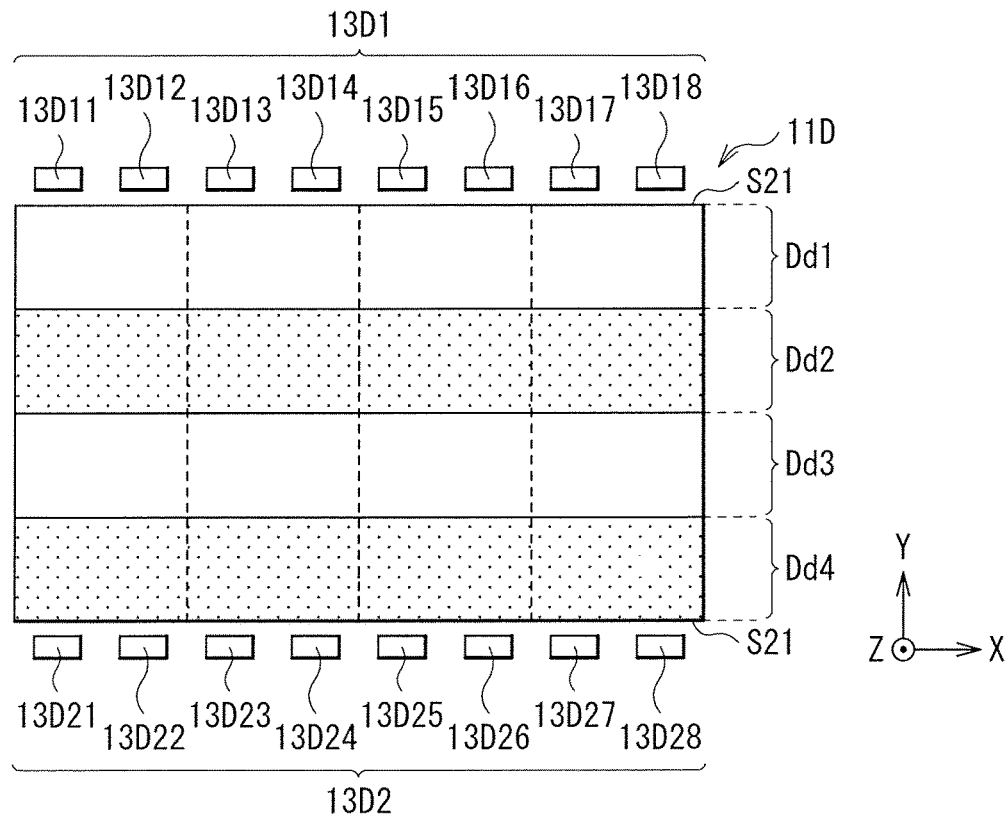

[ FIG. 32A ]
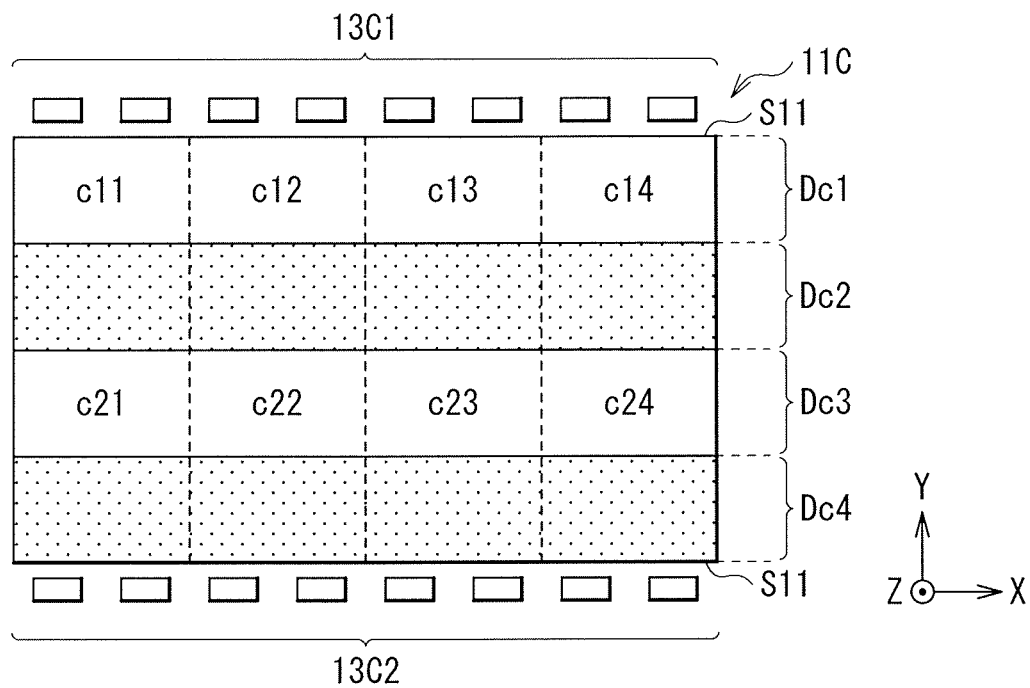
[ FIG. 32B ]
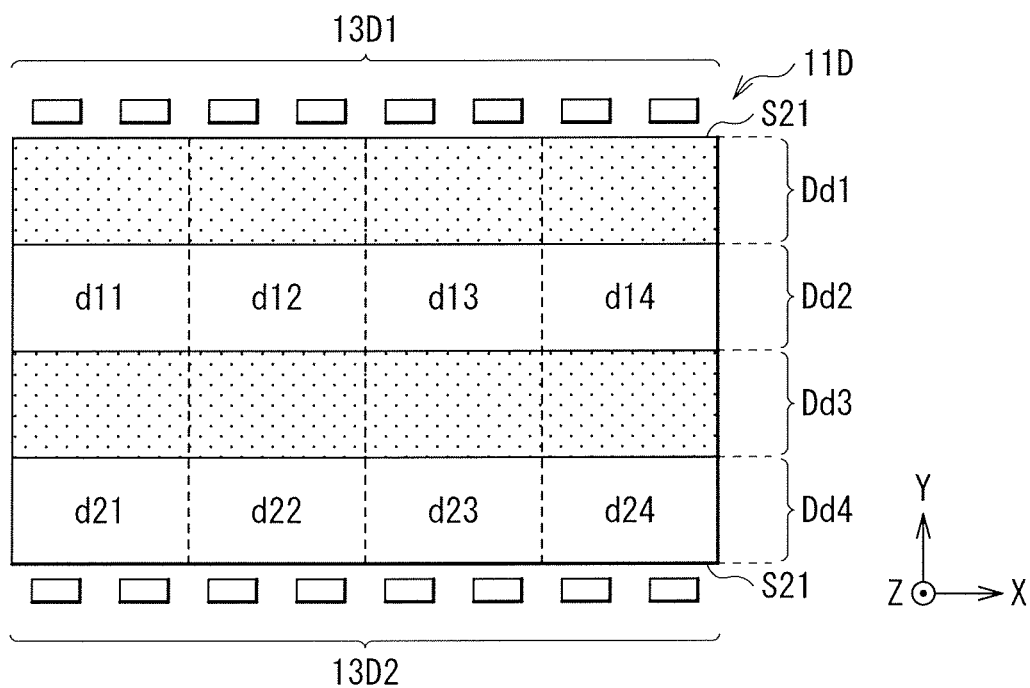

[ FIG. 33 ]
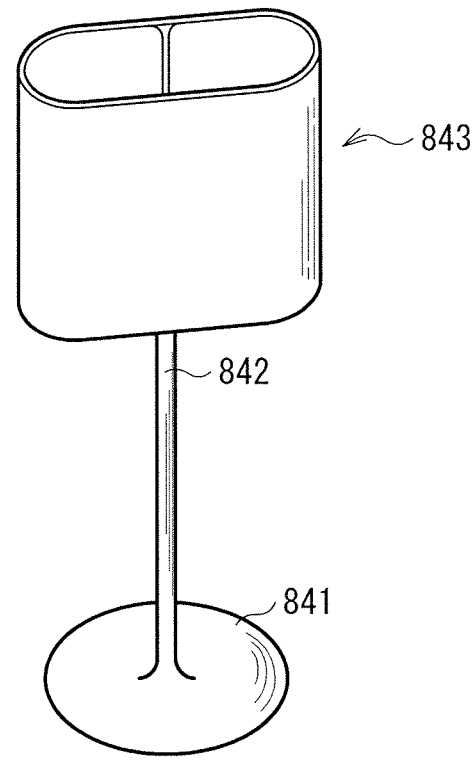
[ FIG. 34 ]
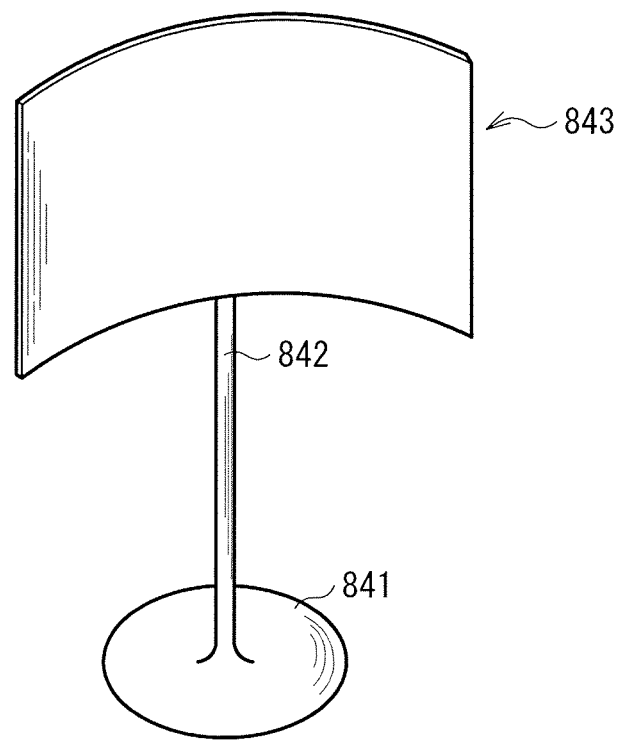

[ FIG. 35 ]
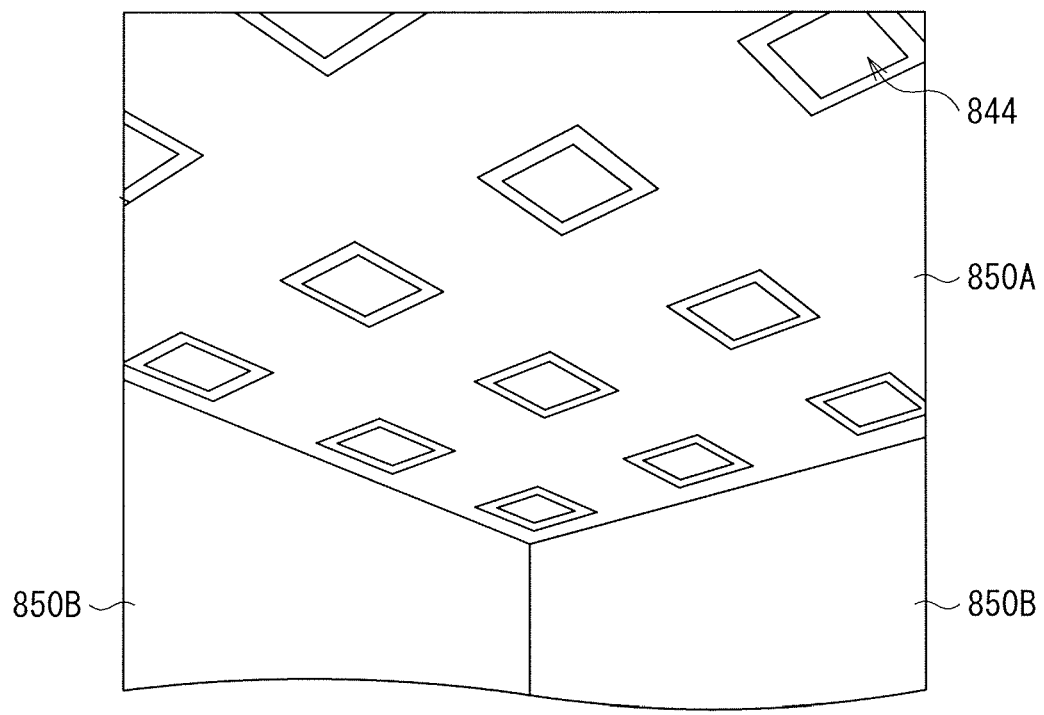

ILLUMINATING UNIT AND DISPLAY APPARATUS

CROSS REFERENCE TO RELATED APPLICATIONS

This application is a U.S. National Phase of International Patent Application No. PCT/JP2016/056202 filed on Mar. 1, 2016, which claims priority benefit of Japanese Patent Application No. JP 2015-077327 filed in the Japan Patent Office on Apr. 6, 2015 and also claims priority benefit of Japanese Patent Application No. JP 2015-227573 filed in the Japan Patent Office on Nov. 20, 2015. Each of the above-referenced applications is hereby incorporated herein by reference in its entirety.

TECHNICAL FIELD

The disclosure relates to an illuminating unit that uses a light-guiding plate, and to a display apparatus that includes such an illuminating unit.

BACKGROUND ART

In a backlight to be used in a display apparatus, so-called partial driving of a screen (local dimming) has been carried out for purpose of improving the image quality.

Nevertheless, in a case where the local dimming is performed, a direct backlight allows for the effective partial driving (segmentation of a light emission region); however, has an issue of an increase in the thickness. Accordingly, the local dimming is proposed that utilizes a backlight of an edge light method (for example, see PTLs 1 and 2). The adoption of the edge light method makes it possible to reduce a thickness of the backlight. Further, the use of a plurality of light-guiding plates achieves the effective partial driving.

CITATION LIST

Patent Literature

[PTL 1] Japanese Unexamined Patent Application Publication No. 2004-303564
[PTL 2] U.S. Pat. No. 8,419,257 B2 Specification

SUMMARY OF THE INVENTION

However, for example, when the backlight of the edge light method as described above is actually incorporated as a unit into a display apparatus or any other equivalent apparatus, there are various restrictions. What is desired is to achieve a specific method that enables reduction in the thickness.

Accordingly, it is desirable to provide an illuminating unit and a display apparatus that make it possible to reduce the thickness.

An illuminating unit according to one embodiment of the disclosure includes: a light-guiding section including a plurality of light-guiding plates, in which the light-guiding plates are stacked in a thickness direction and each have a light entrance section and a light output surface; a plurality of light sources that output light toward the light entrance sections of the respective light-guiding plates of the light-guiding section; and a substrate that supports the plurality of light sources and on which a circuit section is disposed, in which the circuit section drives each of the light sources. A first portion, on which the circuit section is disposed, of the substrate is disposed in opposition to a back surface of the light-guiding section.

A display apparatus according to one embodiment of the disclosure includes the illuminating unit according to the above-described embodiment of the disclosure.

In the illuminating unit and the display apparatus according to the respective embodiments of the disclosure, the circuit section directed to driving of each of the light sources is disposed on the substrate that supports the plurality of light sources, and the first portion, on which the circuit section is disposed, of the substrate is provided in opposition to the back surface of the light-guiding section. This allows the substrate to be disposed by utilizing a space on the back surface side of the light-guiding section in the illuminating unit that uses the light-guiding plates.

In the illuminating unit and the display apparatus according to the respective embodiments of the disclosure, the circuit section directed to driving of each of the light sources is disposed on the substrate that supports the plurality of light sources, and the first portion, on which the circuit section is disposed, of the substrate is provided in opposition to the back surface of the light-guiding section. This allows the substrate to be disposed by utilizing a space on the back surface side of the light-guiding section in the illuminating unit that uses the light-guiding plates. As compared with a case where the substrate is not disposed on the back surface side, this makes it possible to extend the substrate in an in-plane direction of the light-guiding plate, which allows for the efficient use of a space. As a result, it is possible to achieve reduction in the thickness.

It is to be noted that the above descriptions are merely exemplified. The effects of the disclosure are not necessarily limited to the effects described above, and may be other effects, or may further include other effects.

BRIEF DESCRIPTION OF DRAWINGS

FIG. 1 is a cross-sectional view illustrating a configuration of a display apparatus according to one embodiment of the disclosure.

FIG. 2 is a cross-sectional schematic diagram illustrating a configuration of light-guiding plates illustrated in FIG. 1.

FIG. 3A is a schematic diagram for explaining reflective patterns of the upper light-guiding plate illustrated in FIG. 2.

FIG. 3B is a schematic diagram for explaining reflective patterns of the lower light-guiding plate illustrated in FIG. 2.

FIG. 4A is a schematic diagram illustrating a configuration of a cross-sectional surface that includes light sources of a structure illustrated in FIG. 1.

FIG. 4B is a schematic diagram illustrating a configuration of a cross-sectional surface that includes no light sources of a structure illustrated in FIG. 1.

FIG. 5A is a cross-sectional schematic diagram for explaining effects of a backlight unit according to a comparative example 1.

FIG. 5B is a cross-sectional schematic diagram for explaining effects of a backlight unit according to a comparative example 2.

FIG. 6 is a cross-sectional schematic diagram for explaining effects of a backlight unit according to a comparative example 3.

FIG. 7 is a schematic diagram for explaining partial driving that uses the backlight unit illustrated in FIG. 6.

FIG. 8A is a schematic diagram illustrating an example of light source lighting of the light-guiding plate illustrated in FIG. 3A.

FIG. 8B is a schematic diagram illustrating an example of light source lighting of the light-guiding plate illustrated in FIG. 3B.

FIG. 9 is a schematic diagram for explaining partial driving that uses the two light-guiding plates illustrated in FIG. 3A and FIG. 3B.

FIG. 10 is a schematic diagram for explaining effects of a backlight unit according to a comparative example 4.

FIG. 11 is a schematic diagram for explaining effects of the backlight unit illustrated in FIG. 1.

FIG. 12 is a schematic diagram for explaining effects of a backlight unit according to a comparative example 5.

FIG. 13 is a schematic diagram for explaining effects of the backlight unit illustrated in FIG. 1.

FIG. 14 is a characteristic diagram for explaining patterns for light extraction of a light-guiding plate according to a modification example 1.

FIG. 15A is a schematic diagram for explaining the patterns for light extraction of the light-guiding plate according to the modification example 1.

FIG. 15B is a schematic diagram for explaining the patterns for light extraction of the light-guiding plate according to the modification example 1.

FIG. 16 is a characteristic diagram for explaining the patterns for light extraction of the light-guiding plate according to the modification example 1.

FIG. 17A is a schematic diagram for explaining the patterns for light extraction of the light-guiding plate according to the modification example 1.

FIG. 17B is a schematic diagram for explaining the patterns for light extraction of the light-guiding plate according to the modification example 1.

FIG. 18 is a cross-sectional schematic diagram illustrating a major part configuration of a backlight unit according to a modification example 2.

FIG. 19 is a cross-sectional schematic diagram illustrating a major part configuration of a backlight unit according to a modification example 3.

FIG. 20 is a schematic diagram for explaining each light emission region of light sources illustrated in FIG. 19.

FIG. 21A is a cross-sectional schematic diagram illustrating a major part configuration of a backlight unit according to a modification example 4.

FIG. 21B is a cross-sectional schematic diagram illustrating a major part configuration of the backlight unit according to the modification example 4.

FIG. 22 is a schematic diagram of the light sources illustrated in FIG. 21A and FIG. 21B respectively when viewed from the front side.

FIG. 23 is a cross-sectional schematic diagram illustrating a major part configuration of a backlight unit according to a modification example 5.

FIG. 24 is a cross-sectional schematic diagram illustrating a major part configuration of a backlight unit according to a modification example 6.

FIG. 25 is a cross-sectional schematic diagram illustrating a major part configuration of a backlight unit according to a modification example 7.

FIG. 26 is a cross-sectional schematic diagram illustrating a major part configuration of a backlight unit according to a modification example 8.

FIG. 27 is a cross-sectional schematic diagram illustrating a major part configuration of a backlight unit according to a modification example 9.

FIG. 28 is a cross-sectional schematic diagram illustrating a major part configuration of a backlight unit according to a modification example 10.

FIG. 29 is a cross-sectional schematic diagram illustrating a major part configuration of a backlight unit according to a modification example 11.

FIG. 30 is a cross-sectional schematic diagram illustrating a major part configuration of a backlight unit according to a modification example 12.

FIG. 31A is a schematic diagram for explaining reflective patterns of a light-guiding plate (upper side) according to a modification example 13.

FIG. 31B is a schematic diagram for explaining reflective patterns of a light-guiding plate (lower side) according to the modification example 13.

FIG. 32A is a schematic diagram illustrating an example of light source lighting of the light-guiding plate illustrated in FIG. 31A.

FIG. 32B is a schematic diagram illustrating an example of light source lighting of the light-guiding plate illustrated in FIG. 31B.

FIG. 33 is a perspective view illustrating an external appearance of an illuminating unit according to another modification example.

FIG. 34 is a perspective view illustrating an external appearance of an illuminating unit according to another modification example.

FIG. 35 is a perspective view illustrating an external appearance of an illuminating unit according to another modification example.

MODES FOR CARRYING OUT THE INVENTION

Hereinafter, some embodiments of the disclosure are described in detail with reference to the drawings. It is to be noted that the description is given in the following order.
1. Embodiment (an example of a display apparatus including a backlight unit in which a light source substrate is disposed in a bent state)
2. Modification Example 1 (another example of reflective patterns of a light-guiding plate)
3. Modification Example 2 (another example of a bent shape of a substrate)
4. Modification Examples 3 to 5 (examples of a case where an edge-emitting light source is used)
5. Modification Example 6 (an example of a case where a light entrance section of a light-guiding plate is given a shape)
6. Modification Example 7 (an example of a case where light sources of top-emitting and edge-emitting types are used in combination)
7. Modification Examples 8 and 9 (examples of a case where a functional sheet is disposed between light-guiding plates)
8. Modification Examples 10 and 11 (examples of a case where a portion of a light source substrate serves also as a light-shielding member)
9. Modification Example 12 (an example of a case where a substrate end is folded in a Z-shape)
10. Modification Example 13 (another example of disposing light sources)

EMBODIMENT

Configuration

FIG. 1 illustrates a cross-sectional configuration of a display apparatus (a display apparatus 1) according to one embodiment of the disclosure. The display apparatus 1 is, for example, a liquid crystal display, and includes a backlight unit 10, a liquid crystal panel unit 20, a front-side housing 30, and a rear-side housing 31. It is to be noted that the configuration illustrated in FIG. 1 is equivalent to a portion (an end) of the display apparatus 1. It is to be noted that the backlight unit 10 of the present embodiment corresponds to a specific example of the "illuminating unit" in the disclosure.

The backlight unit 10 is a flat plate-shaped surface-emitting light source that illuminates the liquid crystal panel unit 20. A surface shape (X-Y planar shape) of the backlight unit 10 is, for example, a rectangular form. The backlight unit 10 makes it possible to perform driving (partial driving or local dimming) that divides a surface in the X-Y plane into several regions in a light-guiding section to be hereinafter described to vary the emission intensity for each of the divided regions. A specific configuration of the backlight unit 10 will be described later.

The liquid crystal panel unit 20 serves to display images including moving images or still images, and is configured in such a manner that a liquid crystal layer is sealed, for example, between a substrate (TFT substrate) on which a pixel circuit such as a TFT is formed and a substrate (CF substrate) on which color filters are formed. On each surface of light entrance side and light output side of the liquid crystal panel unit 20, a polarizing plate and various types of optical sheets, which are not illustrated in the drawings, are bonded together. Further, on a surface of the liquid crystal panel unit 20, a cover film for protection is attached. A surface shape (X-Y planar shape) of the liquid crystal panel unit 20 is, for example, a rectangular form.

The TFT substrate includes on a glass substrate, for example, a pixel electrode, a TFT (Thin-Film Transistor) device for driving each of pixels, and wiring patterns such as a gate line and a source line to be coupled to the TFT device. The CF substrate includes on a glass substrate, for example, color filters such as red (R), green (G), and blue (B), for example, as well as a counter electrode. The liquid crystal layer includes a liquid crystal that is driven in display methods such as VA mode, IPS mode, and TN mode, for example.

The front-side housing 30 and the rear-side housing 31 are members that support and accommodate the liquid crystal panel unit 20 and the backlight unit 10. The front-side housing 30 is provided with an opening corresponding to an effective display region of the liquid crystal panel unit 20. A constituent material of each of the front-side housing 30 and the rear-side housing 31 is, for example, a metal such as aluminum (Al) and iron (Fe), or is, for example, a resin material such as polycarbonate (PC).

Configuration of Backlight Unit 10

The backlight unit 10 includes, for example, a light-guiding section 11 including a plurality of (two in this example) light-guiding plates 11A and 11B, light sources (13A1 and 13B1) that are provided for each of the light-guiding plates 11A and 11B, a light source substrate 12, an optical sheet 14, a reflective sheet 15, a heat dissipation member 16, a heat diffusion/heat insulation sheet 17, and a light-shielding member 18.

The light-guiding section 11 is configured in such a manner that the two light-guiding plates 11A and 11B are disposed to be laminated along a thickness direction. FIG. 2 schematically illustrates an X-Z cross-sectional configuration of patterns for light extraction (dot patterns) for each of the light-guiding plates 11A and 11B. Each of FIGS. 3A and 3B schematically illustrates an X-Y planar configuration of each pattern for the light-guiding plates 11A and 11B. The light-guiding plates 11A and 11B have light entrance sections (S11 and S21) and light output surfaces (S12 and S22), respectively. The light output surface S12 serves as a light output surface of the whole light-guiding section 11. The light-guiding plate 11A is disposed in opposition to the light output surface S22 of the light-guiding plate 11B, and the optical sheet 14 is bonded onto the light output surface S12 of the light-guiding plate 11A. In such a manner, the light-guiding plates 11A and 11B are disposed to be overlaid one above the other. The patterns for light extraction are formed at selective regions that are different from each other between the light-guiding plates 11A and 11B. Here, the light that is reflected at a region in which such a pattern is formed is emitted (extracted) out of the light output surfaces S12 and S22. An X-Y planar shape of each of the light-guiding plates 11A and 11B is, for example, a rectangular form, as with the backlight unit 10. In the present embodiment, end surfaces that are equivalent to two short sides of the rectangular form in each of the light-guiding plates 11A and 11B serve as the light entrance sections S11 and S21.

As an example, a reflective surface S13 of the light-guiding plate 11A is divided into four regions Da1 to Da4 in the X-Y plane, and patterns that allow larger quantities of light to be extracted are formed at the two regions Da1 and Da3 out of these regions, as compared with the remaining regions Da2 and Da4. For example, the regions Da1 and Da3 have higher pattern density (dot density) than the regions Da2 and Da4. On the contrary, a reflective surface S23 of the light-guiding plate 11B is divided into four regions Db1 to Db4 in the X-Y plane, and patterns that allow larger quantities of light to be extracted are formed at the two regions Db2 and Db4 out of these regions, as compared with the remaining regions Db1 and Db3. For example, the regions Db2 and Db4 have higher pattern density (dot density) than the regions Db1 and Db3. In such a manner, each of the light-guiding plates 11A and 11B is divided into several regions, and patterns are formed densely at selective regions that are different from each other between the upper and lower light-guiding plates in the divided regions.

At the regions Da1, Da3, Db2, and Db4 of the light-guiding plates 11A and 11B, for example, dots including concave portions or convex portions are desirably disposed more densely in increments with increasing distance from light sources.

On the end surfaces (the light entrance sections S11 and S21) of the light-guiding plates 11A and 11B, a plurality of light sources are disposed in opposition to one another. Here, the end surfaces extending along a Y-direction of the light-guiding plates 11A and 11B correspond to the light entrance sections S11 and S21. Further, for the sake of explanation, a case where four light sources are disposed in opposition to one another on each of the end surfaces is cited as an example, and light sources that are disposed on the end surface on the negative side (left side of the drawing) of an X-direction of the light-guiding plate 11A are the light sources 13A1 (13A11 to 13A14), and light sources that are disposed on the end surface on the positive side (right side of the drawing) of the X-direction are the light sources 13A2 (13A21 to 13A24). Similarly, light sources that are disposed on the end surface on the negative side of the X-direction of the light-guiding plate 11B are the light sources 13B1 (13B11 to 13B14), and light sources that are disposed on the end surface on the positive side of the X-direction are the light sources 13B2 (13B21 to 13B24).

In the light-guiding plate 11A, for example, bright and dark (white to black display) of the region Da1 is set by driving the light sources 13A11 to 13A14, and bright and dark (white to black display) of the region Da3 is set by driving the light sources 13A21 to 13A24. Additionally, in such a manner that each of the light sources 13A11 to 13A14 and 13A21 to 13A24 is driven independently, a light emission area is further divided into four at each of the regions Da1 and Da3. In the light-guiding plate 11B, for example, bright and dark (white to black display) of the region Db2 is set by driving the light sources 13B11 to 13B14, and bright and dark (white to black display) of the region Db4 is set by driving the light sources 13B21 to 13B24. Additionally, in such a manner that each of the light sources 13B11 to 13B14 and 13B21 to 13B24 is driven independently, a light emission area is further divided into four at each of the regions Db2 and Db4.

It is to be noted that a configuration in which four light sources are disposed at each of light entrance sections of two light-guiding plates is here cited as an example. However, by increasing the number of the light-guiding plates to three or more, or by further increasing the number of light sources, it is possible to divide more finely (segment) a light emission area in the Y-direction. Further, in FIG. 3A, by changing pattern formation regions, for example, in a manner of forming the patterns selectively at the regions Da1 and Da4 (without forming any patterns at the regions Da2 and Da3), it is also possible to change a region to be irradiated with light emitted by each of the light sources 13A11 to 13A14.

An example of a constituent material for each of the light-guiding plates 11A and 11B includes a highly transparent material such as glass, for example. However, each of the light-guiding plates 11A and 11B may be made of any other material as long as such a material makes it possible to propagate light from each of the light sources 13A1, 13A2, 13B1, and 13B2. For example, a light dispersion material with dispersed particulates of light-scattering properties, or a material made of the light dispersion material may be used alternatively. Specific examples include acrylic resin, polymethylmethacrylate (PMMA), polycarbonate (PC), and cyclic polyolefin (COP).

Each of the light sources 13A1, 13A2, 13B1, and 13B2 includes, for example, an LED (Light-Emitting Diode) chip. Specifically, each of the light sources 13A1, 13A2, 13B1, and 13B2 is configured to emit white light by color mixture by means of the LED chips that emit pieces of light having colors such as red, blue, and green, or by means of a combination of such LED chips with a phosphor or the like. In the present embodiment, any of those light sources 13A1, 13A2, 13B1, and 13B2 is a top-emitting (top-view type) LED.

The light sources 13A1, 13A2, 13B1, and 13B2 are supported by a substrate (the light source substrate 12) (they are formed on the light source substrate 12). On the light source substrate 12, a circuit section (such as a circuit, connectors and wires for coupling to an external substrate) for driving each of the light sources 13A1, 13A2, 13B1, and 13B2 is disposed. Here, the light sources 13A1 and 13B1 (13A11 to 13A14 and 13B11 to 13B14) are disposed on the same substrate as each other, and the light sources 13A2 and 13B2 (13A21 to 13A24 and 13B21 to 13B24) are disposed on the same substrate as each other. It is to be noted that, hereinafter, the description is provided by citing as an example the light source substrate 12 that supports the light sources 13A1 and 13B1; however, a light source substrate that supports the light sources 13A2 and 13B2 has also a configuration that is similar to that of the light source substrate 12.

The light source substrate 12 supports the light sources 13A1 and 13B1 (13A11 to 13A14 and 13B11 to 13B14) as described above, and a portion (a portion 121) in which the circuit section (not illustrated in FIG. 1) that includes a circuit, connectors, or any other element is disposed is provided in opposition to a back surface of the light-guiding section 11. In detail, the portion 121 of the light source substrate 12 is disposed to extend in proximity to back surfaces of the light-guiding plates 11A and 11B. In the present embodiment, the light source substrate 12 has a bent shape that is folded in an L-shaped form, for example. Specifically, the light source substrate 12 is folded substantially at right angle between a portion (a portion 122) that supports the light sources 13A1 and 13B1 and the portion 121 in which the circuit section is disposed.

It is to be noted that the bent shape of the light source substrate 12 is not limited to the L-shaped form as illustrated in the drawing. The portion 121 does not extend along a Z-direction, but may be disposed to wrap around a space on the back surface side of the light-guiding section 11. For example, the bent shape may be folded at an angle larger than 90 degrees or at an angle smaller than 90 degrees, or a corner portion thereof may be rounded.

The optical sheet 14 is provided in opposition to the light output surface of the light-guiding plate 11A, and is configured by a single or a plurality of sheets that fulfill various optical functions to the light outgoing from the light-guiding section 11. Examples of the optical sheet 14 include a diffusion sheet, a prism sheet, and a polarized reflection sheet.

The reflective sheet 15 has a function of reflecting, for example, white light, and includes, for example, white PET with high reflectance, a multi-layer resin film, a metallic film, or the like.

The heat dissipation member 16 is a member for performing heat dissipation to cool the inside of the display apparatus 1 and suppress rise in temperature. The heat dissipation member 16 is disposed to be thermally coupled to the light source substrate 12 on the back surface side of the light-guiding section 11, and is configured by a plate material of aluminum (Al) or the like, for example. The heat dissipation member 16 and the light source substrate 12 are thermally coupled to each other using a bonding member 16a. The heat dissipation member 16 is desirably bonded onto the side of a light source mounting surface of the light source substrate 12. This is because the circuit section is provided on the side of the light source mounting surface, and the effective use of a space that is created by the circuit section allows the heat dissipation member to be coupled, which is advantageous in reduction in the thickness.

The heat diffusion/heat insulation sheet 17 (a composite sheet) includes a heat diffusion function and a heat insulation function, and has a laminated structure stacking a heat diffusion layer having high thermal conductivity and a heat insulation layer. The heat diffusion/heat insulation sheet 17 is desirably disposed to be laid across the light source substrate 12 and the heat dissipation member 16 on each one surface side of the light source substrate 12 and the heat dissipation member 16, as illustrated in FIG. 1. Further, the heat diffusion/heat insulation sheet 17 is also desirably disposed next to both of the portions 121 and 122 along the bent shape of the light source substrate 12. This is because it is possible to efficiently relieve heat generated in the light sources 13A1 and 13B1 to the heat dissipation member 16.

In the heat diffusion/heat insulation sheet 17, it is preferable that the heat insulation layer be disposed next to the rear-side housing 31, and the heat diffusion layer be disposed next to the light source substrate 12 and the heat dissipation member 16. With the advancement of the design performance (lower-profile design), the rear-side housing 31 is used as an exterior packaging in some cases. In such a case, high heat insulating properties are desired because the light sources 13A1 and 13B1 come closer to the exterior packaging and heat is easy to be transferred to the outside. Meanwhile, it is desirable that heat be easy to be transferred from the light source substrate 12 to the heat dissipation member 16. Accordingly, as described above, it is desirable that the heat insulation layer be disposed next to the rear-side housing 31, and the heat diffusion layer be disposed next to the light source substrate 12 and the heat dissipation member 16.

Examples of a constituent material of the heat diffusion layer include graphite, copper, and aluminum. Examples of a constituent material of the heat insulation layer include a plastic material and a foamable cushion. It is possible to use a material that contains these materials that are attached together as the heat diffusion/heat insulation sheet 17.

The light-shielding member 18 is a structure that is provided (around the light entrance sections of the light-guiding plates 11A and 11B) to cover the light sources 13A1 and 13B1, as well as the light entrance sections of the light-guiding plates 11A and 11B. The light-shielding member 18 serves also as a member for fixing the light-guiding plates 11A and 11B, for example. Each of FIGS. 4A and 4B illustrates a cross-sectional configuration of the light-shielding member 18. As illustrated in FIG. 4A, in a cross-sectional surface of the light-shielding member 18 that includes the light sources 13A1 and 13B1, eave portions 18a are disposed in such a manner that the light entrance sections S11 and S21 of the light-guiding plates 11A and 11B are interposed between. As illustrated in FIG. 4B, in a cross-sectional surface of the light-shielding member 18 that includes no light sources 13A1 and 13B1, the eaves portions 18a are joined together in an integrated manner. Such a configuration has locking portions 18b that assure a clearance between the light-guiding plates 11A and 11B and a clearance between the light sources 13A1 and 13B1, and that latch shifting of the light-guiding plates 11A and 11B at positions a2. This makes it possible to suppress reaching of the end surfaces of the light-guiding plates 11A and 11B to upper end positions a1 of the light-guiding plates 11A and 11B due to expansion or positional shifting of the light-guiding plates 11A and 11B, or any other reason, thereby allowing for prevention of any damage of the light sources 13A1 and 13B1.

The light-shielding member 18 desirably includes a light-shielding function and a reflecting function. In this case, the light-shielding member 18 is made of, for example, a gray (gray) resin material. However, the light-shielding member 18 may have only the light-shielding function, or only the reflecting function. This is because the light-shielding member 18 makes it possible to shield light that leaks out of each of the light-guiding plates 11A and 11B, and to get back such light again to the insides of the light-guiding plates 11A and 11B, thereby allowing the light use efficiency to be improved.

Workings and Effects

In the display apparatus 1 of the present embodiment, in the backlight unit 10, the light emitted from the light sources 13A1 and 13B1, or any other light sources propagates through the insides of the light-guiding plates 11A and 11B, and thereafter is emitted out of the light output surfaces to pass through the optical sheet 14. The liquid crystal panel unit 20 is illuminated with such light passing through the optical sheet 14. In the liquid crystal panel unit 20, the light irradiated from the backlight unit 10 is modulated on the basis of image signals to display images.

At the time of such image display, in the backlight unit 10 of the present embodiment, light emission driving with use of the partial driving (local dimming) is carried out. This enhances the contrast, and improves the displayed image quality.

Here, FIGS. 5A and 5B illustrate major part configurations of backlight units according to comparative examples 1 and 2 of the present embodiment, respectively. As seen in the comparative example 1 illustrated in FIG. 5A, in a case where light sources 103 including LEDs are configured as surface light sources by providing them two-dimensionally, this facilitates segmentation of the light emission area, and allows for the efficient partial driving. An optical sheet 101 is disposed above the light sources 103, and a reflective sheet 102 is disposed on the undersurface of the light sources 103. However, in the comparative example 1, to uniform the on-screen luminance, it is desirable to assure a distance from the light source 103 to the light output surface that is equal to or greater than a certain value. This makes it difficult to reduce the thickness. On the contrary, as seen in the comparative example 2 illustrated in FIG. 5B, it is possible to achieve the reduction in the thickness by making a placement interval d101 between the light sources 103 smaller than a placement interval d100 in the comparative example 1. However, this increases the number of light sources, resulting in an increase in cost.

Further, FIG. 6 illustrates a major part configuration of a backlight unit according to a comparative example 3. In such a manner, the use of a light-guiding plate 105 makes it possible to achieve both of the low cost and reduction in the thickness. Light sources 106A1 and 106A2 are disposed on end surfaces of the light-guiding plate 105, and an optical sheet 104a is disposed above the light-guiding plate 105. A reflective sheet 104b is disposed on the undersurface of the light-guiding plate 105. However, in the backlight unit of the comparative example 3, as schematically illustrated in FIG. 7, it is difficult to segment the light emission area of the light-guiding plate 105, and to achieve the efficient partial driving.

Accordingly, as seen in the present embodiment, by using the plurality of light-guiding plates 11A and 11B and by dividing the light emission areas in the light-guiding plates 11A and 11B, it is possible to segment the light emission area (a light-emitting unit area) more finely as compared with the comparative example 3 that uses the single light-guiding plate 105. This makes it possible to further enhance the contrast depending on images, thereby allowing the image quality to be improved.

For example, in the configuration examples of the light-guiding plates 11A and 11B illustrated in FIGS. 2, 3A, and 3B, it is possible to perform the partial driving as described below. That is, in the light-guiding plate 11A, lighting of the light sources 13A11 to 13A14 allows a region Da1 to be irradiated with light (the region Da1 to be put in a light-emitting state) (light emission areas a11 to a14), as illustrated in FIG. 8A. Further, lighting of the light sources 13A21 to 13A24 allows a region Da3 to be irradiated with light (the region Da3 to be put in a light-emitting state) (light emission areas a21 to a24). Meanwhile, in the light-guiding plate 11B, lighting of the light sources 13B11 to 13B14 allows a region Db2 to be irradiated with light (the region Db2 to be put in a light-emitting state) (light emission areas b11 to b14), as illustrated in FIG. 8B. Further, lighting of the light sources 13B21 to 13B24 allows a region Db4 to be irradiated with light (the region Db4 to be put in a light-emitting state) (light emission areas b21 to b24).

By individually setting the emission intensity of the light emission areas a11 to a14, a21 to a24, b11 to b14, and b21 to b24 of each of the light-guiding plates 11A and 11B, it is possible to perform the partial driving in a manner of segmenting (16-segmentation in this example) the light emission area more finely than the comparative example 3 as the whole light-guiding section 11, as illustrated in FIG. 9.

As described above, in performing the partial driving with use of the plurality of light-guiding plates 11A and 11B, light emission driving is carried out for each of the light sources 13A1 and 13B1. Therefore, a large space is necessary for the light source substrate 12 to dispose the circuit section for driving the light sources 13A1 and 13B1.

Here, as seen in a comparative example 4 illustrated in FIG. 10, if a light source substrate 108 that supports the light sources 13A1 and 13B1 and on which a circuit section 108a is mounted is disposed still in a flat plate form, the light source substrate 108 would project significantly to the back surface side (backward), resulting in an increase in a thickness (T100).

On the contrary, in the present embodiment, the portion 121 of the light source substrate 12 is disposed in opposition to the back surface of the light-guiding section 11, as illustrated in FIG. 11. Specifically, the light source substrate 12 has a predetermined bent shape, which makes it possible to extend the light source substrate 12 in the X-Y planar direction, thereby allowing for the efficient use of a space on the back surface side of the light-guiding section 11. It is possible to make the thickness (T1) smaller in comparison with the comparative example 4. This allows reduction in the thickness to be achieved.

Further, the heat diffusion/heat insulation sheet 17 is disposed between the light source substrate 12 and the rear-side housing 31, which offers the following effects. Specifically, as seen in a comparative example 5 illustrated in FIG. 12, in a case where the heat diffusion/heat insulation sheet 17 is not provided, cooling of heat (X1) generated in the vicinity of the light sources 13A1 and 13B1 becomes insufficient. Further, there is also a possibility that heat will be transferred from the rear-side housing 31 to the outside, which may cause exterior packaging temperature to increase above the specified temperature (X2). On the contrary, in the present embodiment, as illustrated in FIG. 13, the heat diffusion/heat insulation sheet 17 is disposed between the light source substrate 12 and the rear-side housing 31, which makes it possible to efficiently transfer the heat to the heat dissipation member 16 while blocking heat conduction from the light sources 13A1 and 13B1 to the exterior packaging (S1). This allows the reliability to be improved.

As described above, in the present embodiment, the circuit section for driving each of the light sources 13A1 and 13B1 is disposed on the light source substrate 12 that supports the plurality of light sources 13A1 and 13B1, and the portion 121 on which the circuit section of the light source substrate 12 is disposed is provided in opposition to the back surface of the light-guiding section 11. As a result, in the backlight unit 10 that uses the plurality of light-guiding plates 11A and 11B, it is possible to dispose the light source substrate 12 with efficient use of a space on the back surface side of the light-guiding section 11. This allows reduction in the thickness to be achieved.

Hereinafter, the description is provided on modification examples of the above-described embodiment. It is to be noted that any component parts similar to those in the above-described embodiment are denoted with the same reference numerals, and the related descriptions are omitted as appropriate.

Modification Example 1

FIGS. 14, 15A, and 15B each explain patterns for light extraction of a light-guiding plate according to a modification example 1. FIGS. 16, 17A, and 17B each explain the patterns for light extraction of the light-guiding plate according to the modification example 1. In the above-described embodiment, the light emission area is segmented depending on the presence or absence of the patterns on each region basis in each of the light-guiding plates 11A and 11B. However, in the present modification example, the light emission area is segmented depending on high or low pattern density. It is to be noted that each of the above-described drawings illustrates a pattern density of the light-guiding plate 11A as an example.

Here, as seen in the example illustrated in FIG. 14, in a case where patterns are disposed only at regions Da1 and Da3 (in a case where the density varies rapidly), if a light source 13A1 is driven to irradiate the region Da1 of the light-guiding plate 11A with light, a boundary p1 between the region Da1 and a region Da2 becomes noticeable, leading to unnatural display, as schematically illustrated in FIG. 15A. In a similar manner, if a light source 13A2 is driven to irradiate the region Da3 of the light-guiding plate 11A with light, a boundary p2 between the region Da2 and the region Da3 becomes noticeable, leading to unnatural display, as schematically illustrated in FIG. 15B.

Accordingly, in the present modification example, as illustrated in FIG. 16, the patterns are disposed not only at the regions Da1 and Da3 of the light-guiding plate 11A, but also at the region Da2 (the density varies gradually). As a result, when the light source 13A1 is driven to irradiate the region Da1 of the light-guiding plate 11A with light, the boundary between the region Da1 and the region Da2 blurs moderately, leading to natural display, as schematically illustrated in FIG. 17A. In a similar manner, if the light source 13A2 is driven to irradiate the region Da3 of the light-guiding plate 11A with light, the boundary between the region Da2 and the region Da3 blurs moderately, leading to natural display, as schematically illustrated in FIG. 17B.

As seen in the present modification example, the light emission area may be segmented depending on high or low pattern density of the light-guiding plates 11A and 11B. Further, the pattern density desirably varies gradually at a boundary between each of the light emission areas. This is advantageous in further improving the image quality.

Modification Example 2

FIG. 18 illustrates a major part configuration of a backlight unit according to a modification example 2. In the above-described embodiment, the description is provided on the case where the light source substrate takes the shape that is bent in an L-shaped form. However, the bent shape is not limited thereto, and various shapes are available. For example, as seen in a light source substrate 12A of the present modification example, the light source substrate may take a shape that is folded at two positions.

Specifically, the light source substrate 12A has a portion 121 on which circuit sections of light sources 13A and 13B1 are disposed, a portion 122 on which the light sources 13A1 and 13B1 are mounted (disposed), and a portion 123 that is disposed in opposition to the light output surface S12 of the light-guiding plate 11A. The light source substrate 12A has a bent shape that is folded between the portions 121 and 122, and is folded between the portions 122 and 123. The portion 123 is disposed in opposition to the light output surface of the light-guiding section 11.

Modification Example 3

FIG. 19 illustrates a major part configuration of a backlight unit according to a modification example 3. In the above-described embodiment, the description is provided by citing as an example the light sources 13A1 and 13B1 including the top-emitting LEDs. However, as seen in the present modification example, a light source (a light source 130C) including an edge-emitting LED may be used alternatively.

The light source 130C is an edge-emitting (side-view type) LED having, for example, a plurality of (two in this example) light emission regions (active layers) 130C1 and 130C2 at different height positions. Such a light source 130C is disposed on a light source substrate 12B. The light source substrate 12B supports the light source 130C, and has the portion 121 on which the circuit section is disposed. In the present modification example as well, the portion 121 of the light source substrate 12B is disposed in opposition to the back surface of the light-guiding section 11. However, the light source substrate 12B takes a flat plate shape, and the light source 130C is disposed on an extending surface of the portion 121. As illustrated in FIG. 20, the light emission regions 130C1 and 130C2 are coupled to separate wires 130a and 130b respectively, and are subjected to light emission driving individually.

As described above, in a case of using, for example, the edge-emitting light source 130C, the light source substrate 12B may not have to be bent. Even when the light source substrate 12B is not folded, it is possible to make efficient use of a space on the back surface side of the light-guiding section 11, thereby allowing the thickness of the whole apparatus to be reduced. This makes it possible to achieve the effects similar to those of the above-described embodiment.

Modification Example 4

Each of FIGS. 21A, 21B, and 22 illustrates a major part configuration of a backlight unit according to a modification example 4. In the above-described embodiment, the description is provided by citing as an example the light sources 13A1 and 13B1 including the top-emitting LEDs. However, as seen in the present modification example, light sources (light sources 130D1 and 130D2) including edge-emitting LEDs may be used alternatively.

Each of the light sources 130D1 and 130D2 is an edge-emitting (side-view type) LED having, for example, light emission regions (active layers) at positions that are different in height from each other. Both of such light sources 130D1 and 130D2 are disposed on the same light source substrate 12B. The light source substrate 12B supports the light sources 130D1 and 130D2, and has the portion 121 on which the circuit section is disposed. In the present modification example as well, the portion 121 of the light source substrate 12B is disposed in opposition to the back surface of the light-guiding section 11. Further, the light sources 130D1 and 130D2 are disposed one after the other along the Y-direction, for example, as illustrated in FIG. 22.

As described above, in a case of using, for example, the edge-emitting light sources 130D1 and 130D2, the light source substrate 12B may not have to be bent. Even when the light source substrate 12B is not folded, it is possible to make efficient use of a space on the back surface side of the light-guiding section 11, thereby allowing the thickness of the whole apparatus to be reduced. This makes it possible to achieve the effects similar to those of the above-described embodiment.

Modification Example 5

FIG. 23 illustrates a major part configuration of a backlight unit according to a modification example 5. In the above-described embodiment, the description is provided by citing as an example the light sources 13A1 and 13B1 including the top-emitting LEDs. However, as seen in the present modification example, light sources (light sources 130D1 and 130D2) including edge-emitting LEDs may be used alternatively.

Each of the light sources 130D1 and 130D2 is an edge-emitting (side-view type) LED having, for example, light emission regions (active layers) at positions that are different in height from each other, as with the above-described modification example 4. Both of such light sources 130D1 and 130D2 are disposed on the same light source substrate 12B. The light source substrate 12B supports the light sources 130D1 and 130D2, and has the portion 121 on which the circuit section is disposed. In the present modification example as well, the portion 121 of the light source substrate 12B is disposed in opposition to the back surface of the light-guiding section 11. However, in the present modification example, the light sources 130D1 and 130D2 are disposed at anteroposterior positions in the X-direction. The light entrance sections S11 and S21 of the light-guiding plates 11A and 11B are disposed at positions corresponding to the positions of the light sources 130D1 and 130D2.

As described above, in a case of using, for example, the edge-emitting light sources 130D1 and 130D2, the light source substrate 12B may not have to be bent. Even when the light source substrate 12B is not folded, it is possible to make efficient use of a space on the back surface side of the light-guiding section 11, thereby allowing the thickness of the whole apparatus to be reduced. This makes it possible to achieve the effects similar to those of the above-described embodiment.

Modification Example 6

FIG. 24 illustrates a major part configuration of a backlight unit according to a modification example 6. In the above-described modification examples 3 to 5, the description is provided by citing a configuration example where the light sources including the edge-emitting LEDs and the flat plate-shaped light source substrate are used in combination. However, as seen in the present modification example, light sources 13A1 and 13B1 including top-emitting LEDs and the flat plate-shaped light source substrate 12B may be used in combination.

The light source substrate 12B supports the light sources 13A1 and 13B1, and has the portion 121 on which the circuit section is disposed. In the present modification example as well, the portion 121 of the light source substrate 12B is disposed in opposition to the back surface of the light-guiding section 11. However, in the present modification example, tilted surfaces t11 and t21 are formed at the light entrance sections S11 and S21 of light-guiding plates 11A1 and 11A2, respectively. With such a configuration, the light emitted from the light sources 13A1 and 13B1 in the positive Z-direction is reflected by the tilted surfaces t11 and t21 to be guided to the X-Y planar direction of the light-guiding plates 11A1 and 11A2. It is to be noted that an example where the tilted surfaces are formed at the light entrance sections S11 and S21 is given here; however, a curved surface may be formed alternatively.

As seen in the present modification example, by contriving shapes of the light entrance sections S11 and S21 of the light-guiding plates 11A1 and 11A2, it is also possible to use, for example, the top-emitting light sources 13A1 and 13B1 and the light source substrate 12B having no bent shape in combination. In such a case as well, it is possible to make efficient use of a space on the back surface side of the light-guiding section 11, thereby allowing the thickness of the whole apparatus to be reduced. This makes it possible to achieve the effects similar to those of the above-described embodiment.

Modification Example 7

FIG. 25 illustrates a major part configuration of a backlight unit according to a modification example 7. In the above-described embodiment, the description is provided on the case where the light sources including the top-emitting LEDs are used, and in the above-described modification examples 3 to 5, the description is provided on the case where the light sources including the edge-emitting LEDs are used. However, as seen in the present modification example, the top-emitting LEDs and the edge-emitting LEDs may be used in combination.

For example, a top-emitting light source 13B1 may be disposed in opposition to the light entrance section of the light-guiding plate 11A2 having the tilted surface t21, and an edge-emitting light source 130D2 may be disposed in opposition to the light entrance section of the light-guiding plate 11A. In such a case, it is possible to dispose the light sources 13B1 and 130D2 on the flat plate-shaped light source substrate 12B, for example.

Modification Example 8

FIG. 26 illustrates a major part configuration of a backlight unit according to a modification example 8. In the above-described embodiment, the light-shielding member 18 is provided to cover the surrounding area of the light entrance sections of the light-guiding plates 11A and 11B. However, instead of the light-shielding member 18, or in addition to the light-shielding member 18, a mirror sheet 18B having both of a light-shielding function and a reflecting function may be disposed between the light-guiding plates 11A and 11B.

The mirror sheet 18B is configured by, for example, a mirror-surface tone sheet, a metallic thin film, or the like. The mirror sheet 18B is interposed between the light sources 13A1 and 13B1, and is disposed between the light-guiding plates 11A and 11B. The use of the mirror sheet 18B in such a manner makes it possible to reflect while shielding the light in the vicinity of the light entrance sections between the light-guiding plates 11A and 11B.

Modification Example 9

FIG. 27 illustrates a major part configuration of a backlight unit according to a modification example 9. In the above-described embodiment, the light-shielding member 18 is provided to cover the surrounding area of the light entrance sections of the light-guiding plates 11A and 11B. However, instead of the light-shielding member 18, or in addition to the light-shielding member 18, a multi-layered sheet 18C having both of a light-shielding function and a reflecting function may be disposed between the light-guiding plates 11A and 11B.

The multi-layered sheet 18C is interposed between the light sources 13A1 and 13B1, and is disposed between the light-guiding plates 11A and 11B. The multi-layered sheet 18C is configured in such a manner that a pair of white layers 18c2 is provided with a black layer 18c1 interposed between, for example. The use of such a multi-layered sheet 18C makes it possible to reflect while shielding the light in the vicinity of the light entrance sections between the light-guiding plates 11A and 11B.

Modification Example 10

FIG. 28 illustrates a major part configuration of a backlight unit according to a modification example 10. In the above-described embodiment, the light-shielding member 18 is provided to cover the surrounding area of the light entrance sections of the light-guiding plates 11A and 11B. However, as seen in the present modification example, a portion of the light source substrate 12 may serve as also a portion of the light-shielding member 18.

Specifically, the portion 121 of the light source substrate 12 serves to have the light-shielding function on the back surface side of the light-guiding plate 11B. As with the above-described embodiment, the eave portions 18a each of which configures the light-shielding member 18 are disposed on the light output surface side of the light-guiding plate 11A, and between the light-guiding plates 11A and 11B. In such a manner, a portion of the light source substrate 12 may serve as also a portion of the light-shielding member 18. Such a configuration is more advantageous in reducing the thickness.

Modification Example 11

FIG. 29 illustrates a major part configuration of a backlight unit according to a modification example 11. In the above-described embodiment, the light-shielding member 18 is provided to cover the surrounding area of the light entrance sections of the light-guiding plates 11A and 11B. However, as seen in the present modification example, a portion of the light source substrate 12A may serve as also a portion of the light-shielding member 18.

Specifically, the portion 121 of the light source substrate 12A according to the above-described modification example 2 serves to have the light-shielding function on the back surface side of the light-guiding plate 11B. Further, the portion 123 of the light source substrate 12A serves to have the light-shielding function on the light output surface side of the light-guiding plate 11A. As with the above-described embodiment, the eave portions 18a each of which configures the light-shielding member 18 are disposed between the light-guiding plates 11A and 11B. In such a manner, a portion of the light source substrate 12A may serve as also a portion of the light-shielding member 18. Such a configuration is more advantageous in reducing the thickness.

Modification Example 12

FIG. 30 illustrates a major part configuration of a backlight unit according to a modification example 12. In the above-described embodiment, the description is provided on the case where the light source substrate takes the shape that is bent in the L-shaped form. However, the bent shape is not limited thereto, and various shapes are available. For example, as seen in a light source substrate 12C of the present modification example, an end on the back surface side of the light-guiding section 11 may be folded in a Z-shaped form (Z shape).

Specifically, the end of the light source substrate 12C has a bent portion 12c1 that is folded in the Z-shaped form to allow an end portion of the light source substrate 12C to come closer to the light-guiding section 11. The heat dissipation member 16 is thermally coupled to such a bent portion 12c1 adjacently from the outer side. The heat dissipation member 16 is disposed at a space that is created by the bent portion 12c1. In such a manner, the light source substrate may take a variety of bent shapes. Further, the number of folded positions is not limited to 1 to 3, and may be four or more. Moreover, a corner portion that is formed by folding the light source substrate may be rounded. The light source substrate may take a variety of shapes depending on a shape of an exterior packaging, or layout of other components.

Modification Example 13

FIG. 31A schematically illustrates reflective patterns of a light-guiding plate (an upper light-guiding plate 11C) according to a modification example 13. FIG. 31B schematically illustrates reflective patterns of a light-guiding plate (a lower light-guiding plate 11D) according to the modification example 13. In the above-described embodiment and the like, the description is provided on a configuration in which end surfaces corresponding to short sides of rectangular forms of the light-guiding plates 11A and 11B serve as the light entrance sections S11 and S21; however, positions where light sources are disposed are not limited thereto. For example, the light sources may be disposed in opposition to end surfaces corresponding to long sides of a rectangular form of the light-guiding plate, or the light sources may be disposed on end surfaces corresponding to four sides of the rectangular form. Here, as an example, the description is provided on a configuration in which the light sources are disposed in opposition to end surfaces corresponding to two long sides.

As with the above-described embodiment, in the present modification example, the light-guiding section 11 includes two light-guiding plates 11C and 11D, and the light-guiding plate 11C is disposed to be stacked on the light-guiding plate 11D. The light-guiding plates 11C and 11D have light entrance sections (S11 and S21), and light output surfaces, respectively. On the light-guiding plates 11C and 11D, patterns for light extraction are formed at selective regions that are different from one another.

However, in the present modification example, end surfaces corresponding to two long sides of rectangular forms of the light-guiding plates 11C and 11D serve as the light entrance sections S11 and S21.

As an example, as illustrated in FIG. 31A, a reflective surface of the light-guiding plate 11C is divided into four regions Dc1 to Dc4 in the X-Y plane, and patterns that allow larger quantities of light to be extracted are formed at the two regions Dc1 and Dc3 out of these regions, as compared with the remaining regions Dc2 and Dc4. For example, the regions Dc1 and Dc3 have higher pattern density (dot density) than the regions Dc2 and Dc4. On the contrary, as illustrated in FIG. 31B, a reflective surface of the light-guiding plate 11D is divided into four regions Dd1 to Dd4 in the X-Y plane, and patterns that allow larger quantities of light to be extracted are formed at the two regions Dd2 and Dd4 out of these regions, as compared with the remaining regions Dd1 and Dd3. For example, the regions Dd2 and Dd4 have higher pattern density (dot density) than the regions Dd1 and Dd3. In such a manner, each of the light-guiding plates 11C and 11D is divided into several regions, and patterns for light extraction are formed densely at selective regions that are different from each other between the upper and lower light-guiding plates in the divided regions.

At the regions Dc1 and Dc3 of the light-guiding plate 11C, and the regions Dd2 and Dd4 of the light-guiding plate 11D, for example, dots including concave portions or convex portions are preferably disposed more densely in increments with increasing distance from light sources.

On the end surfaces (the light entrance sections S11 and S21) of the light-guiding plates 11C and 11D, a plurality of light sources are disposed in opposition to one another. Here, the end surfaces extending along the X-direction of the light-guiding plates 11C and 11D correspond to the light entrance sections S11 and S21. Further, for the sake of explanation, a case where eight light sources are disposed in opposition to one another on each of the end surfaces is cited as an example, and light sources that are disposed on the end surface on the positive side (upper side of the drawing) of the Y-direction of the light-guiding plate 11C are light sources 13C1 (13C11 to 13C18), and light sources that are disposed on the end surface on the negative side (lower side of the drawing) of the Y-direction are light sources 13C2 (13C21 to 13C28). Similarly, light sources that are disposed on the end surface on the positive side of the Y-direction of the light-guiding plate 11D are light sources 13D1 (13D11 to 13D18), and light sources that are disposed on the end surface on the negative side of the Y-direction are light sources 13D2 (13D21 to 13D28).

In the light-guiding plate 11C, for example, bright and dark (white to black display) of the region Dc1 is set by driving the light sources 13C11 to 13C18, and bright and dark (white to black display) of the region Da3 is set by driving the light sources 13C21 to 13C28. Additionally, in such a manner that each of the light sources 13C11 to 13C18 and 13C21 to 13C28 is driven independently, a light emission area is further divided at each of the regions Dc1 and Dc3. In the light-guiding plate 11D, for example, bright and dark (white to black display) of the region Dd2 is set by driving the light sources 13D11 to 13D18, and bright and dark (white to black display) of the region Dd4 is set by driving the light sources 13D21 to 13D28. Additionally, in such a manner that each of the light sources 13D11 to 13D18 and 13D21 to 13D28 is driven independently, a light emission area is further divided at each of the regions Db2 and Db4.

FIGS. 32A and 32B schematically illustrate examples of light source lighting of the light-guiding plates 11C and 11D, respectively. As illustrated in FIG. 32A, in the light-guiding plate 11C, lighting of the light sources 13C1 (13C11 to 13C18) allows the region Dc1 to be irradiated with light (light emission areas c11 to c14). Further, lighting of the light sources 13C2 (13C21 to 13C28) allows the region Dc3 to be irradiated with light (light emission areas c21 to c24). Meanwhile, in the light-guiding plate 11D, lighting of the light sources 13D1 (13D11 to 13D18) allows the region Dd2 to be irradiated with light (light emission areas d11 to d14), as illustrated in FIG. 32B. Further, lighting of the light sources 13D2 (13D21 to 13D28) allows the region Dd4 to be irradiated with light (light emission areas d21 to d24).

By individually setting the emission intensity of the light emission areas c11 to c14, c21 to c24, d11 to d14, and d21 to d24 of each of the light-guiding plates 11C and 11D, it is possible to perform the partial driving in a manner of segmenting (for example, 16-segmentation as illustrated in FIG. 9) the light emission area as the whole light-guiding section 11, as with the above-described embodiment.

The disclosure is described thus far with reference to the embodiment and the modification examples thereof; however, the disclosure is not limited to the above-described embodiment and the modification examples thereof, but various modifications may be made. For example, a material, etc., of each member mentioned in the above-described embodiment and the modification examples thereof is not limited thereto, and any other material may be used alternatively.

Further, the number of the light-guiding plates, shapes thereof, and the like that are described in the above-described embodiment and the modification examples thereof are not limited to those described above. In addition, the number of the light sources, placement locations, and pitches and the like of the light sources are also not limited to those described above.

Additionally, the illuminating unit of the disclosure is not limited to the backlight unit of the display apparatus as described above, and is also applicable to any of the illuminating units as illustrated in FIGS. 33 to 35, for example. Any of illuminating units illustrated in FIG. 33 and FIG. 34 is a tabletop or floor illuminating unit, and includes an illuminating section 843 having a configuration similar to that of the backlight unit 10 of the above-described embodiment. The illuminating section 843 may be mounted to a support post 842 that is provided on a base 841, for example. The illuminating section 843 is able to take an outer shape such as a tubular shape illustrated in FIG. 33, or a curved surface shape illustrated in FIG. 34 by configuring the light-guiding section 11 (the light-guiding plates 11A and 11B) in a curviform shape. An illuminating unit illustrated in FIG. 35 includes an illuminating section 844 having a configuration similar to that of the backlight unit 10 of the above-described embodiment. The single illuminating section 844 or the plurality of illuminating sections 844 (the plural illuminating sections 844 in this example) are disposed at predetermined spacing intervals on a ceiling 850A of a building. It is to be noted that the illuminating section 844 may be installed not only on the ceiling 850A, but also on a wall 850B, a floor (not illustrated in the drawing), or the like depending on the intended use. Further, the illuminating section 844 is not limited to the indoor use, and may be applied for the outdoor use.

It is to be noted that the effects described herein are merely exemplified and non-limiting, and effects of the disclosure may be other effects, or may further include other effects. Further, the disclosure may be configured as follows.

(1)

An illuminating unit including:

a light-guiding section including a plurality of light-guiding plates, the light-guiding plates being stacked in a thickness direction and each having a light entrance section and a light output surface;

a plurality of light sources that output light toward the light entrance sections of the respective light-guiding plates of the light-guiding section; and a substrate that supports the plurality of light sources and on which a circuit section is disposed, the circuit section driving each of the light sources, a first portion, on which the circuit section is disposed, of the substrate being disposed in opposition to a back surface of the light-guiding section.

(2)

The illuminating unit according to (1), in which the substrate includes the first portion and a second portion, and has a bent shape, the second portion being disposed in opposition to the light entrance section, the bent shape being folded between the first portion and the second portion, and the plurality of light sources are disposed at the second portion of the substrate.

(3)

The illuminating unit according to (1) or (2), further including a structure that is provided between the plurality of light-guiding plates and covers a portion on side of the light entrance section of the light-guiding plate, and having one or both of a light-shielding function and a reflecting function.

(4)

The illuminating unit according to (3), in which the structure has a portion that assures a clearance between the light-guiding plate and the light source, and that latches shifting of the light-guiding plate to side of the light source.

(5)

The illuminating unit according to (3) or (4), in which the structure includes a grey resin material.

(6)

The illuminating unit according to (1), in which the substrate includes the first portion, a second portion, and a third portion, and has a bent shape, the second portion being disposed in opposition to the light entrance section, the third portion being disposed in opposition to a front surface of the light-guiding section, the bent shape being folded between the first portion and the second portion and between the second portion and the third portion, and the plurality of light sources are disposed at the second portion of the substrate.

(7)

The illuminating unit according to any one of (1) to (6), further including a heat dissipation member disposed on side of the back surface of the light-guiding section and thermally coupled to the substrate.

(8)

The illuminating unit according to (7), further including a multi-layered sheet disposed on each one surface side of the heat dissipation member and the substrate and disposed to lie across the heat dissipation member and the substrate, and including a heat diffusion layer and a heat insulation layer.

(9)

The illuminating unit according to (7) or (8), in which the heat dissipation member is thermally coupled to a surface, on which the light source is mounted, of the substrate.

(10)

The illuminating unit according to any one of (7) to (9), in which an end of the substrate is folded in a Z-shaped form, and the heat dissipation member is disposed at a space created by the folding of the substrate in the Z-shaped form, and is thermally coupled to the substrate.

(11)

The illuminating unit according to any one of (1) to (10), in which the light source includes a top-emitting type light-emitting diode.

(12)

The illuminating unit according to (1), in which
the substrate has a flat plate shape, and
the plurality of light sources are disposed on an extending surface of the first portion of the substrate.

(13)

The illuminating unit according to (12), in which
the plurality of light sources are configured by an edge-emitting type light-emitting diode, and
the light-emitting diode has a plurality of light emission regions formed at positions that are different in height from each other.

(14)

The illuminating unit according to (12), in which the plurality of light sources each include an edge-emitting type light-emitting diode, and a height of a light emission region is different for each of the light-guiding plates.

(15)

The illuminating unit according to (12), in which
the light sources each include a top-emitting type light-emitting diode, and
the light entrance section of the light-guiding plate has a tilted surface or a curved surface.

(16)

The illuminating unit according to any one of (1) to (15), further including a functional sheet disposed between the plurality of light-guiding plates at a portion on side of the light entrance section of the light-guiding plate, and having both of a light-shielding function and a reflecting function.

(17)

The illuminating unit according to (16), in which the functional sheet includes a mirror surface-tone sheet, a metallic thin film, or a laminated film in which a light-shielding layer is interposed between a pair of reflecting layers.

(18)

The illuminating unit according to any one of (1) to (17), in which the plurality of light-guiding plates each have patterns at a plurality of selective regions in a plane parallel to the light output surface, the patterns being directed to light extraction and being disposed in higher density than other regions.

(19)

A display apparatus provided with an illuminating unit, the illuminating unit including:
a light-guiding section including a plurality of light-guiding plates, the light-guiding plates being stacked in a thickness direction and each having a light entrance section and a light output surface;
a plurality of light sources that output light toward the light entrance sections of the respective light-guiding plates of the light-guiding section; and
a substrate that supports the plurality of light sources and on which a circuit section is disposed, the circuit section driving each of the light sources,
a first portion, on which the circuit section is disposed, of the substrate being disposed in opposition to a back surface of the light-guiding section.

The present application is based on and claims priority from Japanese Patent Application No. 2015-77327 filed with the Japan Patent Office on Apr. 6, 2015, and Japanese Patent Application No. 2015-227573 filed with the Japan Patent Office on Nov. 20, 2015, the entire contents of which are incorporated in this application by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An illuminating unit, comprising:
a light-guiding section including a plurality of light-guiding plates, wherein the light-guiding plates of the plurality of light-guiding plates are stacked in a thickness direction of the illuminating unit, and each light-guiding plate of the plurality of light-guiding plates includes at least one light entrance section and a light output surface;
a plurality of light sources configured to output light toward light entrance sections of the plurality of light-guiding plates of the light-guiding section, a first light source of the plurality of light sources disposed to face a first light entrance section of a first light-guiding plate of the plurality of light-guiding plates and a second light source of the plurality of light sources disposed to face a second light entrance section of the first light-guiding plate;
a substrate onto which the plurality of light sources are mounted so as to permit the first light source and second light source to face the first light-guiding plate, the substrate comprising a first portion that includes an extended surface onto which the plurality of light sources are mounted and a second portion that extends away from the first portion;
a heat dissipation member including a first section and a second section, the first section disposed between a back surface side of one of the plurality of light guiding plates and the second portion of the substrate and the second section disposed between a heat diffusion/insulation sheet and the back surface side of one of the plurality of light guiding plates, such that the second section is not disposed between the back surface side of one of the plurality of light guiding plates and the second portion of the substrate; and
a circuit section on the second portion of the substrate, wherein the circuit section is configured to drive each light source of the plurality of light sources, and the second portion is opposite to a back surface of the light-guiding section, the circuit section driving the first light source and second light source so as to divide a light emission area of the light output surface of the first light-guiding plate into different regions.

2. The illuminating unit according to claim 1, wherein
a shape of the substrate corresponds to a bent shape,
the first portion is opposite to the at least one light entrance section of each light-guiding plate of the plurality of light-guiding plates, and
the bent shape is foldable between the first portion and the second portion.

3. The illuminating unit according to claim 1, wherein
a structure comprising a functional sheet covers a portion, of the illuminating unit, on a side of the at least one light entrance section of each light-guiding plate of the plurality of light-guiding plates, and
a function of the functional sheet corresponds to at least one of a light-shielding function or a light-reflecting function.

4. The illuminating unit according to claim 3, wherein
a portion of the structure assures a clearance between the plurality of light-guiding plates and a respective light source of the plurality of light sources, and
the portion of the structure latches shifting of the plurality of light-guiding plates to a side of the respective light source of the plurality of light sources.

5. The illuminating unit according to claim 3, wherein the structure further includes a grey resin material.

6. The illuminating unit according to claim 1, wherein the substrate further includes a third portion,
a shape of the substrate corresponds to a bent shape,
the first portion is opposite to the at least one light entrance section of each light-guiding plate of the plurality of light-guiding plates,
the third portion is opposite to a front surface of the at least one light-guiding section,
the bent shape is foldable between the first portion and the second portion, and between the second portion and the third portion, and
the plurality of light sources is at the first portion of the substrate.

7. The illuminating unit according to claim 1, wherein the heat diffusion/insulation sheet is a laminated structure.

8. The illuminating unit according to claim 1, further comprising a multi-layered sheet on each surface of the heat dissipation member and the substrate, wherein
the multi-layered sheet is across the heat dissipation member and the substrate, and
the multi-layered sheet includes a heat diffusion layer and a heat insulation layer.

9. The illuminating unit according to claim 1, wherein the heat dissipation member is thermally coupled to a surface, of the substrate, on which the plurality of light sources is mounted.

10. The illuminating unit according to claim 1, wherein an end of the substrate is folded in a Z-shaped form,
the heat dissipation member is at a space created by the substrate folded in the Z-shaped form, and
the heat dissipation member is thermally coupled to the substrate.

11. The illuminating unit according to claim 1, wherein each light source of the plurality of light sources comprises a top-emitting type light-emitting diode.

12. The illuminating unit according to claim 1, comprising a functional sheet interposed between at least one pair of the plurality of light sources and arranged so as to be disposed between a corresponding pair of the plurality of light guide plates.

13. The illuminating unit according to claim 1, wherein the plurality of light sources includes an edge-emitting type light-emitting diode,
the edge-emitting type light-emitting diode comprises a plurality of light emission regions, and
a position of each light emission region of the plurality of light emission regions is different in height.

14. The illuminating unit according to claim 1, wherein each light source of the plurality of light sources comprises an edge-emitting type light-emitting diode,
the edge-emitting type light-emitting diode includes at least one light emission region, and
a height of the at least one light emission region is different for each light-guiding plate of the plurality of light-guiding plates.

15. The illuminating unit according to claim 1, wherein each light source of the plurality of light sources comprises a top-emitting type light-emitting diode, and
the light entrance section of each light-guiding plate of the plurality of light-guiding plates has one of a tilted surface or a curved surface.

16. The illuminating unit according to claim 1, further comprising a functional sheet wherein the functional sheet is at a portion on a side of the at least one light entrance section of each light-guiding plate of the plurality of light-guiding plates, and
a function of the functional sheet corresponds to at least one of a light-shielding function or a light-reflecting function.

17. The illuminating unit according to claim 16, further comprising a light-shielding layer, wherein
the functional sheet comprises one of a mirror surface-tone sheet, a metallic thin film, or a laminated film, and
the light-shielding layer is between a pair of reflecting layers.

18. The illuminating unit according to claim 1, wherein each light-guiding plate of the plurality of light-guiding plates includes a plurality of patterns at a plurality of selective regions,
the plurality of selective regions is in a plane parallel to the light output surface of the respective light-guiding plate of the plurality of light-guiding plates,
the plurality of patterns is associated with a light extraction process, and
the plurality of patterns is in a specific density region of each light-guiding plate of the plurality of light-guiding plates.

19. The illuminating unit according to claim 1, wherein at least one light-guiding plate of the plurality of light-guiding plates comprises a surface having a first region and second region, the first region having a dot density that is higher than a dot density of the second region.

20. A display apparatus, comprising:
an illuminating unit that comprises:
a light-guiding section including a plurality of light-guiding plates, wherein the light-guiding plates of the plurality of light-guiding plates are stacked in a thickness direction of the illuminating unit, and each light-guiding plate of the plurality of light-guiding plates includes at least one light entrance section and a light output surface;
a plurality of light sources configured to output light toward light entrance sections of the plurality of light-guiding plates of the light-guiding section, a first light source of the plurality of light sources disposed to face a first light entrance section of a first light-guiding plate of the plurality of light-guiding plates and a second light source of the plurality of light sources disposed to face a second light entrance section of the first light-guiding plate;
a substrate onto which the plurality of light sources are mounted so as to permit the first light source and second light source to face the first light-guiding plate, the substrate comprising a first portion that includes an extended surface onto which the plurality of light sources are mounted and a second portion that extends away from the first portion;
a heat dissipation member including a first section and a second section, the first section disposed between a back surface side of one of the plurality of light guiding plates and the second portion of the substrate and the second section disposed between a heat diffusion/insulation sheet and the back surface side of one of the plurality of light guiding plates, such that the second section is not disposed between the back surface side of one of the plurality of light guiding plates and the second portion of the substrate; and
a circuit section on the second portion of the substrate, wherein the circuit section is configured to drive each light source of the plurality of light sources, and the second portion is opposite to a back surface of the light-guiding section, the circuit section driving the first light source and second light source so as to divide a light emission area of the light output surface of the first light-guiding plate into different regions.

21. The display apparatus according to claim 20, wherein the heat diffusion/insulation sheet is a laminated structure.

* * * * *